US012651566B2

(12) United States Patent
Shang et al.

(10) Patent No.: US 12,651,566 B2
(45) Date of Patent: Jun. 9, 2026

(54) DISPLAY PANEL AND METHOD FOR MANUFACTURING THE SAME, AND DISPLAY APPARATUS

(71) Applicant: BOE Technology Group Co., Ltd., Beijing (CN)

(72) Inventors: Guangliang Shang, Beijing (CN); Li Wang, Beijing (CN); Haibo Li, Beijing (CN); Baoyun Wu, Beijing (CN); Yanxia Xin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/867,229

(22) PCT Filed: Aug. 12, 2024

(86) PCT No.: PCT/CN2024/111535
§ 371 (c)(1),
(2) Date: Nov. 19, 2024

(87) PCT Pub. No.: WO2025/066610
PCT Pub. Date: Apr. 3, 2025

(65) Prior Publication Data

US 2025/0372031 A1 Dec. 4, 2025

(30) Foreign Application Priority Data

Sep. 28, 2023 (CN) ........................ 202311271348.X

(51) Int. Cl.
*G09G 3/32* (2016.01)
*G09G 3/3225* (2016.01)

(52) U.S. Cl.
CPC ... *G09G 3/3225* (2013.01); *G09G 2300/0819* (2013.01); *G09G 2300/0842* (2013.01);
(Continued)

(58) Field of Classification Search
CPC ......... G09G 3/3225; G09G 2300/0819; G09G 2300/0842; G09G 2300/0861;
(Continued)

(56) References Cited

U.S. PATENT DOCUMENTS

2016/0203758 A1* 7/2016 Tsuge ..................... G09G 3/325
345/76
2020/0211458 A1* 7/2020 He ....................... G09G 3/3233
2023/0098040 A1 3/2023 Zhou et al.

FOREIGN PATENT DOCUMENTS

CN 108806605 A 11/2018
CN 111710300 A 9/2020
(Continued)

OTHER PUBLICATIONS

CN202311271348.X first office action dated Mar. 11, 2026.

*Primary Examiner* — Michael A Faragalla
(74) *Attorney, Agent, or Firm* — IPro, PLLC

(57) ABSTRACT

A pixel circuit and a driving method thereof, a display panel and a display device are provided, which belong to the field of display technologies. The pixel circuit includes a driving circuit and a compensation circuit. The driving circuit can transmit a reset power source signal to a driving node to reset a light-emitting component connected to the driving node; and can transmit a light emission driving signal to the driving node to drive the light-emitting component connected to the driving node to emit light.

18 Claims, 10 Drawing Sheets

(52) U.S. Cl.
CPC . *G09G 2300/0861* (2013.01); *G09G 2310/08* (2013.01); *G09G 2320/0233* (2013.01); *G09G 2330/021* (2013.01); *G09G 2340/0435* (2013.01)

(58) Field of Classification Search
CPC ......... G09G 2310/08; G09G 2330/021; G09G 2340/0435
See application file for complete search history.

(56) References Cited

FOREIGN PATENT DOCUMENTS

| | | | |
|---|---|---|---|
| CN | 113571016 | A | 10/2021 |
| CN | 114514573 | A | 5/2022 |
| CN | 114694593 | A | 7/2022 |
| CN | 114899211 | A | 8/2022 |
| CN | 115699147 | A | 2/2023 |
| CN | 116615968 | A | 8/2023 |
| CN | 116798341 | A | 9/2023 |
| CN | 117174029 | A | 12/2023 |
| WO | 2022170661 | A1 | 8/2022 |

* cited by examiner

DISPLAY PANEL AND METHOD FOR MANUFACTURING THE SAME, AND DISPLAY APPARATUS

CROSS-REFERENCE TO RELATED APPLICATION

The present disclosure is a national stage of PCT application No. PCT/CN2024/111535, filed on Aug. 12, 2024, which claims priority to Chinese Patent Application No. 202311271348.X, filed on Sep. 28, 2023 and entitled "PIXEL CIRCUIT AND DRIVING METHOD THEREOF, DISPLAY PANEL AND DISPLAY DEVICE", the entire contents of both of which are incorporated herein by reference.

TECHNICAL FIELD

The present disclosure relates to the field of display technologies, and in particular, to a pixel circuit and a driving method thereof, a display panel and a display device.

BACKGROUND

A display panel generally includes a substrate, and pixels disposed on the substrate. The pixel includes a pixel circuit and a light-emitting component. The pixel circuit is connected to the light-emitting component and is configured to transmit a light emission driving signal to the light-emitting component to drive the light-emitting component to emit light, and transmit a reset power source signal to the light-emitting component to reset the light-emitting component, so that the light-emitting components of different pixels can emit light at the same potential based on the received light emission driving signals. In addition, in order to reduce power consumption, low-frequency or variable-frequency driving is mostly used and designed pixel circuits including P-type and N-type low-temperature poly-silicon oxide (LTPO) transistors are mostly used. In this scenario, the light-emitting component is charged and discharged multiple times within one frame, that is, the reset power source signal is transmitted repeatedly multiple times.

However, due to the relatively poor stability of a potential of the reset power source signal, it is impossible to reliably charge and discharge the light-emitting component, which in turn leads to abnormal display, i.e., uneven screen splitting, of the display panel.

SUMMARY

A pixel circuit and a driving method thereof, a display panel and a display device are provided.

The technical solutions are as follows.

In an aspect, a pixel circuit is provided. The pixel circuit includes:

- a driving circuit which is connected to a driving control line, a reset control line, a reset power source line and a driving node respectively and is configured to: transmit a light emission driving signal to the driving node based on a driving control signal provided by the driving control line; and control switching on and off of a connection between the reset power source line and the driving node under control of a reset control signal provided by the reset control line, the driving node being configured to be connected to a light-emitting component; and

- a compensation circuit which is connected to a compensation control line, a compensation signal line and the reset power source line respectively, and is configured to control the reset power source line to provide the same reset power source signal at any period based on a compensation signal provided by the compensation signal line under control of a compensation control signal provided by the compensation control line.

Optionally, the compensation control line includes a first compensation control line and a second compensation control line; a potential of the compensation signal provided by the compensation signal line is determined based on a potential of the driving node when the light-emitting component emits light at a target greyscale;

- the compensation circuit is further connected to an equivalent node of the driving node and a pull-down power source line connected to the light-emitting component respectively; the compensation circuit is configured to control switching on and off of a connection between the compensation signal line and the equivalent node based on a first compensation control signal provided by the first compensation control line, control switching on and off of a connection between the reset power source line and the equivalent node based on a second compensation control signal provided by the second compensation control line, and also regulate a potential of the equivalent node based on a pull-down power source signal provided by the pull-down power source line; and
- the driving node is configured to be connected to a first electrode of the light-emitting component, and a second electrode of the light-emitting component is connected to the pull-down power source line.

Optionally, the compensation circuit includes:

- a first switching sub-circuit which is connected to the first compensation control line, the compensation signal line and the equivalent node respectively, and is configured to control switching on and off of a connection between the compensation signal line and the equivalent node based on the first compensation control signal;
- a second switching sub-circuit which is connected to the second compensation control line, the equivalent node and the reset power source line respectively, and is configured to control switching on and off of a connection between the reset power source line and the equivalent node based on the second compensation control signal; and
- a potential-regulating sub-circuit which is connected to the equivalent node and the pull-down power source line respectively, and is configured to regulate the potential of the equivalent node based on the pull-down power source signal.

Optionally, the first switching sub-circuit includes a first transistor, the second switching sub-circuit includes a second transistor, and the potential-regulating sub-circuit includes a capacitor, wherein

- a gate of the first transistor is connected to the first compensation control line, a first electrode of the first transistor is connected to the compensation signal line, and a second electrode of the first transistor is connected to the equivalent node;
- a gate of the second transistor is connected to the second compensation control line, a first electrode of the second transistor is connected to the reset power source line, and a second electrode of the second transistor is connected to the equivalent node; and the capacitor is connected in series between the equivalent node and the pull-down power source line.

Optionally, the compensation control line includes: a first compensation control line and a second compensation control line; the compensation signal line includes: a first compensation signal line and a second compensation signal line, a compensation signal provided by the first compensation signal line is the reset power source signal provided by the reset power source line in the refresh period, and the reset power source signal provided by the reset power source line is controlled to be the same as the compensation signal provided by the first compensation signal line based on a compensation signal provided by the second compensation signal line; and the compensation circuit is configured to control switching on and off of a connection between the first compensation signal line and the reset power source line based on a first compensation control signal provided by the first compensation control line, and control switching on and off of a connection between the second compensation signal line and the reset power source line based on a second compensation control signal provided by the second compensation control line.

Optionally, the compensation circuit includes:

a third switching sub-circuit which is connected to the first compensation control line, the first compensation signal line and the reset power source line respectively, and is configured to control switching on and off of a connection between the first compensation signal line and the reset power source line based on the first compensation control signal; and a fourth switching sub-circuit which is connected to the second compensation control line, the second compensation signal line and the reset power source line respectively, and is configured to control switching on and off of a connection between the second compensation signal line and the reset power source line based on the second compensation control signal.

Optionally, the compensation signal provided by the second compensation signal line is the same as the compensation signal provided by the first compensation signal line;

or the compensation signal provided by the second compensation signal line is different from the compensation signal provided by the first compensation signal line; and the compensation circuit further includes: a voltage-dividing sub-circuit connected in series between the second compensation signal line and the fourth switching sub-circuit.

Optionally, the third switching sub-circuit includes a third transistor, the fourth switching sub-circuit includes a fourth transistor, and the voltage-dividing sub-circuit includes a voltage-dividing resistor, wherein a gate of the third transistor is connected to the first compensation control line, a first electrode of the third transistor is connected to the first compensation signal line, and a second electrode of the third transistor is connected to the reset power source line;

a gate of the fourth transistor is connected to the second compensation control line, a first electrode of the fourth transistor is connected to the second compensation signal line, and a second electrode of the fourth transistor is connected to the reset power source line; and the voltage-dividing resistor is connected in series between the second compensation signal line and the first electrode of the fourth transistor.

Optionally, each transistor in the pixel circuit includes: an active layer, a gate metal layer and a source-drain metal layer which are successively stacked, wherein the active layer of the transistor in the compensation circuit extends along a first direction; the compensation control line and the compensation signal line which are connected to the compensation circuit both extend along a second direction, and the compensation control line and the gate metal layer are disposed in the same layer; the compensation signal line and the source-drain metal layer are disposed in the same layer; and the second direction intersects with the first direction.

In another aspect, a driving method for a pixel circuit is provided, the driving method is applicable to the pixel circuit as described in the above aspect and the method includes: a plurality of refresh periods that are executed sequentially, and waiting periods between every two adjacent refresh periods;

in the refresh period and the waiting period, a compensation circuit controls a reset power source line to provide the same reset power source signal based on a compensation signal provided by a compensation signal line under control of a compensation control signal provided by a compensation control line; and in the refresh period, a driving circuit controls a connection between the reset power source line and a driving node connected to a light-emitting component to be firstly switched on and then switched off under control of a reset control signal provided by a reset control line, and after controlling the connection between the reset power source line and the driving node to be switched off, transmits a light emission driving signal to the driving node based on a driving control signal provided by a driving control line so as to drive the light-emitting component to emit light.

Optionally, the compensation control line includes a first compensation control line and a second compensation control line; a potential of the compensation signal is determined based on a potential of the driving node when the light-emitting component emits light at a target greyscale; and that the compensation circuit controls the reset power source line to provide the same reset power source signal based on the compensation signal provided by the compensation signal line under control of the compensation control signal provided by the compensation control line includes:

in the refresh period, the compensation circuit controls both a connection between the compensation signal line and an equivalent node of the driving node and a connection between the reset power source line and the equivalent node to be switched off under control of a first compensation control signal provided by the first compensation control line and a second compensation control signal provided by the second compensation control line; and in the waiting period, the compensation circuit controls the connection between the compensation signal line and the equivalent node and the connection between the reset power source line and the equivalent node to be alternately switched on under control of the first compensation control signal and the second compensation control signal so as to control the reset power source line to provide the same reset power source signal in both the refresh period and the waiting period.

Optionally, the compensation control line includes: a first compensation control line and a second compensation control line; the compensation signal line includes: a first compensation signal line and a second compensation signal line, a compensation signal provided by the first compensation signal line is the reset power source signal provided by the reset power source line in the refresh period, and the reset power source signal provided by the reset power source line is controlled to be the same as the compensation signal provided by the first compensation signal line based on a compensation signal provided by the second compensation signal line; and that the compensation circuit controls the reset power source line to provide the same reset power source signal based on the compensation signal provided by the compensation signal line under control of the compensation control signal provided by the compensation control line includes:

in the refresh period, the compensation circuit controls a connection between the first compensation signal line and the reset power source line to be switched on under control of a first compensation control signal provided by the first compensation control line, and controls a connection between the second compensation signal line and the reset power source line to be switched off under control of a second compensation control signal provided by the second compensation control line; and in the waiting period, the compensation circuit controls the connection between the second compensation signal line and the reset power source line to be switched on under control of the second compensation control signal, and controls the connection between the first compensation signal line and the reset power source line to be switched off under control of the first compensation control signal.

In still another aspect, a display panel is provided, and the display panel includes a substrate and pixels disposed on the substrate, wherein the pixel includes: a light-emitting component and a pixel circuit as described in the above another aspect, wherein the pixel circuit is connected to the light-emitting component and is configured to drive the light-emitting component to emit light.

Optionally, the substrate includes a display region and a non-display region which are adjacent; and the driving circuit included in the pixel circuit is disposed in the display region, and the compensation circuit included in the pixel circuit is disposed in the non-display region.

In yet still another aspect, a display device is provided. The display device includes a power supply assembly, and the display panel as described in the above still another aspect, wherein the power supply assembly is connected to the display panel and is configured to supply power to the display panel.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions and advantages in the present disclosure, the embodiments of the present disclosure are described in further detail below with reference to the accompanying drawings.

It should be noted that transistors used in all embodiments of the present disclosure may be thin film transistors, field-effect transistors or other devices having the same properties, and mainly are switching transistors according to their functions in a circuit. Since a source and a drain of the switching transistor used here are symmetrical, the source and the drain of the switching transistor are interchangeable. In the embodiments of the present disclosure, the source is referred to as a first electrode and the drain is referred to as a second electrode. According to the form in the figure, it's specified that a middle terminal of the transistor is a control electrode, which may also be called a gate, a signal input terminal is the source, and a signal output terminal is the drain. In addition, the switching transistors used in the embodiments of the present disclosure may include either P-type switching transistors or N-type switching transistors.

The P-type switching transistor is turned on when the gate is at a low level and is turned off when the gate is at a high level, and the N-type switching transistor is turned on when the gate is at the high level and is turned off when the gate is at the low level. In addition, a plurality of signals in various embodiments of the present disclosure each correspond to a first potential and a second potential. The first potential and the second potential only represent that the potential of the signal has two state quantities, instead of representing that the first potential or the second potential in the whole text has a specific value.

Figure 1:
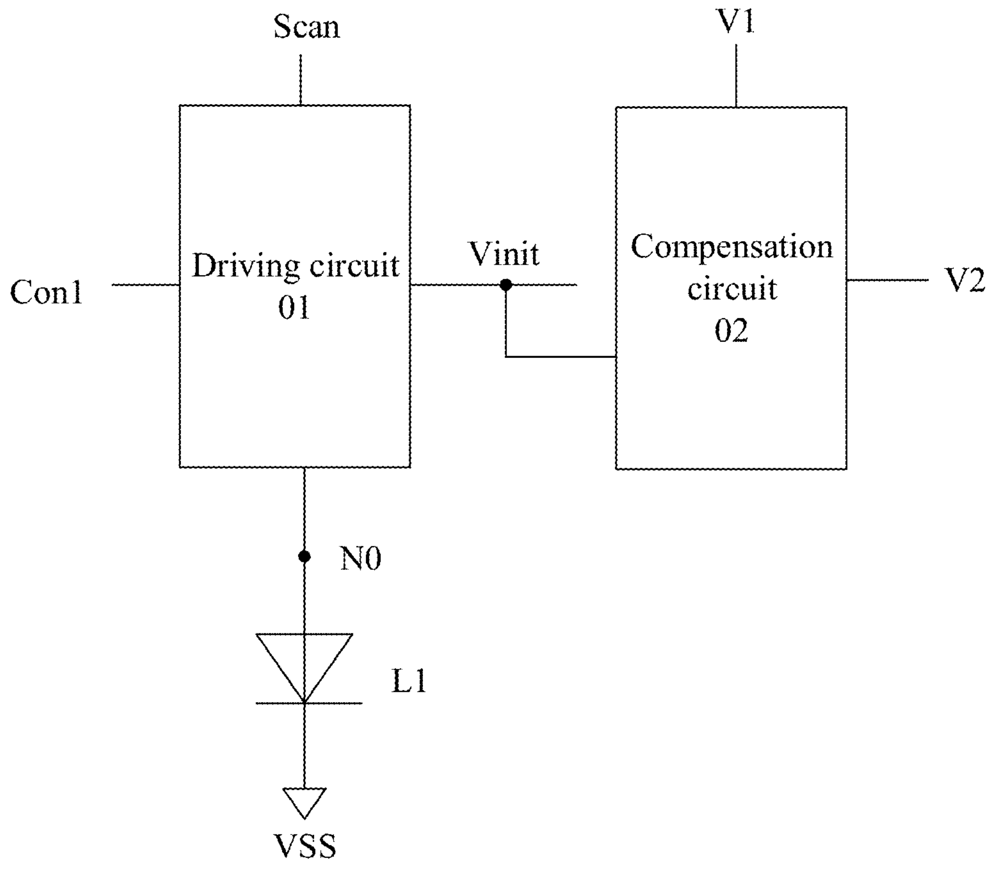
FIG. 1 is a structural schematic diagram of a pixel circuit according to embodiments of the present disclosure.

FIG. 1 is a structural schematic diagram of a pixel circuit according to embodiments of the present disclosure. As shown in FIG. 1, the pixel circuit includes:

a driving circuit 01 which is connected to a driving control line Con1, a reset control line Scan, a reset power source line Vinit and a driving node N0 respectively and is configured to: transmit a light emission driving signal to the driving node N0 based on a driving control signal provided by the driving control line Con1; and control switching on and off of a connection between the reset power source line Vinit and the driving node N0 under control of a reset control signal provided by the reset control line Scan.

The driving node N0 is configured to be connected to a light-emitting component L1. Optionally, referring to FIG. 1, the driving node N0 may be configured to be connected to a first electrode of the light-emitting component L1, and a second electrode of the light-emitting component L1 may also be connected to a pull-down power source line VSS. Here, the first electrode of the light-emitting component L1 may be an anode, and the second electrode of the light-emitting component L1 may be a cathode. Certainly, in some other embodiments, the first electrode of the light-emitting component L1 may be a cathode, and the second electrode of the light-emitting component L1 may be an anode. That is, the anode and the cathode of the light-emitting component L1 are interchangeable.

In an exemplary embodiment, the driving circuit 01 may control the connection between the reset power source line Vinit and the driving node N0 to be switched on when a potential of a reset control signal provided by the reset control line Scan is a first potential, so that a reset power source signal provided by the reset power source line Vinit is transmitted to the driving node N0 so as to reset the anode of the light-emitting component L1. The driving circuit 01 may control the connection between the reset power source line Vinit and the driving node N0 to be switched off when the potential of the reset control signal provided by the reset control line Scan is a second potential. Afterwards, the driving circuit 01 may transmit a light emission driving signal to the driving node N0, so that the light-emitting component L1 emits light reliably under the action of a voltage difference between the light emission driving signal and a pull-down power source signal provided by the pull-down power source line VSS. A period in which the light-emitting component L1 is controlled to emit light is also called a refresh period, a waiting (Porch) period is included between every two adjacent refresh periods, and the anode of the light-emitting component L1 may be reset in both the Porch period and the refresh period.

Optionally, in the embodiments of the present disclosure, the first potential may be an effective potential, the second potential may be an ineffective potential, and the first potential may be a low potential relative to the second potential, of course, for a P-type transistor that the low potential is effective. The first potential is a high potential relative to the second potential for an N-type transistor.

Figure 2:
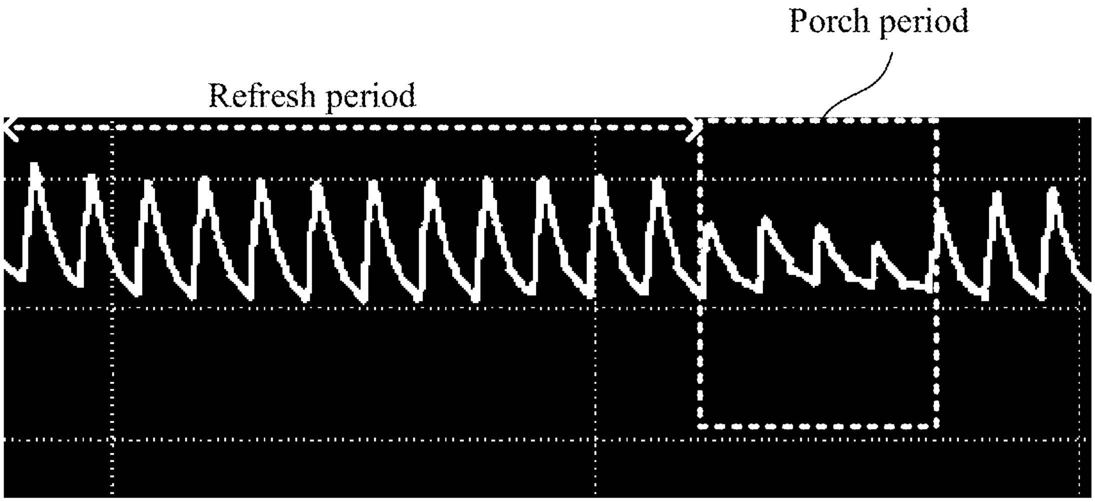
FIG. 2 is a waveform diagram of a reset power source signal provided by a reset power source line in the related art.

As described in the Background Art, the stability of a potential of a reset power source signal provided by a reset power source terminal Vinit is relatively poor. In an exemplary embodiment, as shown in FIG. 2, the reset power source signal has different potentials in various refresh periods and the Porch periods between every two adjacent refresh periods, and generally the potential in the Porch period is less than that in the refresh period. As a result, the luminance of light emitted by the light-emitting component that resets the driving node N0 is relatively low in the Porch period, leading to the problem of abnormal display, i.e., uneven screen splitting. However, in the embodiments of the present disclosure, continuously referring to FIG. 1, it can be seen that the pixel circuit further includes:

a compensation circuit 02 which is connected to a compensation control line V1, a compensation signal line V2 and the reset power source line Vinit respectively, and is configured to control the reset power source line Vinit to provide the same reset power source signal at any period based on a compensation signal provided by the compensation signal line V2 under control of a compensation control signal provided by the compensation control line V1 to effectively compensate for the reset power source signal at a relatively low potential in the Porch period as shown in FIG. 2.

Figure 3:
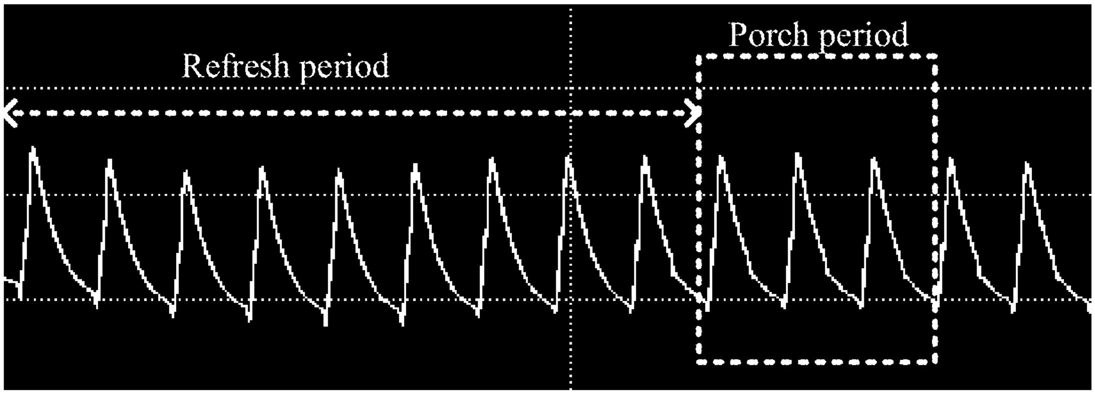
FIG. 3 is a waveform diagram of a reset power source signal provided by a reset power source line according to embodiments of the present disclosure.

That is, in the embodiments of the present disclosure, the reset power source line Vinit is controlled to be able to provide the same reset power source signal as shown in FIG. 3 in both the Porch period and the refresh period shown in FIG. 2, so that it is ensured that the stability of the potential of the reset power source signal is better and then the problem of abnormal display, i.e., uneven screen splitting, is improved. It should be noted that in conjunction with FIG. 2 and FIG. 3, it can be seen that the expression that the reset power source line Vinit is controlled to provide the same reset power source signal in any period in the embodiments of the present disclosure means that the reset power source signal is controlled to have the same fluctuation amplitude and the same potential average in all periods.

In summary, the embodiments of the present disclosure provide a pixel circuit. The pixel circuit includes the driving circuit and the compensation circuit. The driving circuit can transmit the reset power source signal to the driving node to reset the light-emitting component connected to the driving node; and can transmit the light emission driving signal to the driving node to drive the light-emitting component connected to the driving node to emit light. The compensation circuit can control the reset power source line to provide the same reset power source signal at any period, that is, ensure that the stability of the potential of the reset power source signal transmitted to the driving node is better. In this way, even if the light-emitting component is charged and discharged multiple times within one frame, reliable reset of the light-emitting component can be ensured, thereby avoiding abnormal display, i.e., uneven screen splitting, of a display panel and ensuring a better display effect.

Figure 4:
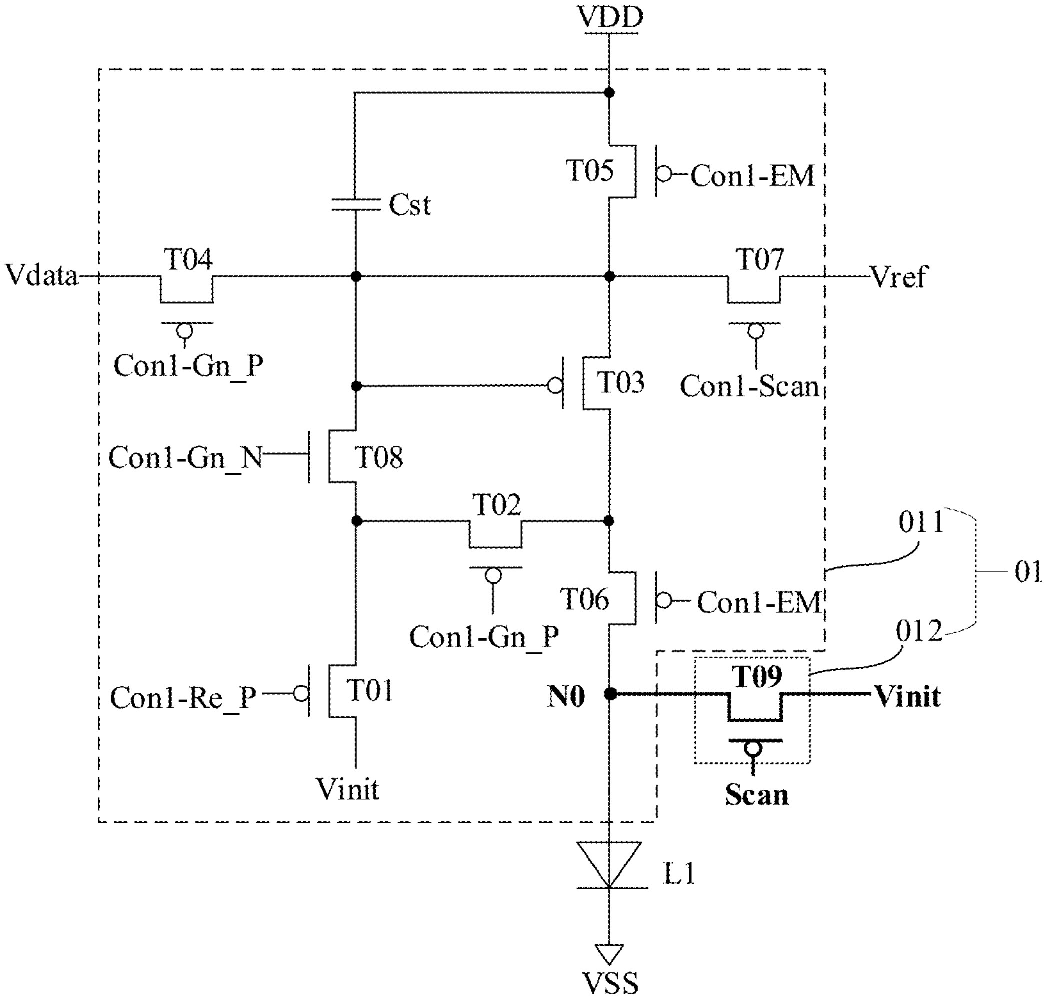
FIG. 4 is a circuit structure diagram of a driving circuit in the pixel circuit according to embodiments of the present disclosure.

Optionally, FIG. 4 shows a circuit structure diagram of a driving circuit according to embodiments of the present disclosure. As shown in FIG. 4, the driving circuit 01 may include a driving portion 011 and a reset portion 012.

The driving portion 011 may be connected to a driving control line Con1 and a driving node N0 respectively and may be configured to: transmit a light emission driving signal to the driving node N0 based on a driving control signal provided by the driving control line Con1.

The reset portion 012 may be connected to a driving control line Scan, a reset power source line Vinit and the driving node N0 respectively and may be configured to: control switching on and off of a connection between the reset power source line Vinit and the driving node N0 under control of a reset control signal provided by the reset control line Scan.

Optionally, referring to FIG. 4, it can further be seen that the driving portion 011 may include eight transistors, i.e., T01 to T08, and one storage capacitor Cst. A transistor T08 may be an N-type oxide transistor; and the remaining transistors except the transistor T08 may all be P-type low-temperature poly-silicon transistors. In this way, the driving circuit 01 including the driving portion 011 may be called a driving circuit 01 of an LTPO structure. The driving control line Con1 connected to the driving portion 011 may include gate lines Gn_P connected to gates of the P-type transistors, a gate line Gn_N connected to a gate of the N-type transistor, a reset line Re_P, and a light emission control line EM, and further includes the reset control line Scan as described in the above embodiment. In addition, the driving portion 011 may further be connected to a data line Vdata, a reference line Vref and a driving power source line VDD. The driving portion 011 may transmit a light emission driving signal to the driving node N0 based on a data signal provided by the data line Vdata, a reference signal provided by the reference line Vref, a driving power source signal provided by the driving power source line VDD and the reset power source signal under control of signals provided by the above control lines so as to drive the light-emitting component L1 to emit light. The transistor T03 may be a driving transistor for generating a required light emission driving signal. The reset portion 012 may include one transistor T09, and the transistor T09 may be a P-type low-temperature poly-silicon transistor. A gate of the transistor T09 may be connected to the reset control line Scan, a first electrode of the transistor T09 may be connected to the reset power source line Vinit, and a second electrode of the transistor T09 may be connected to the driving node N0.

Based on the above structure, it can be seen that when the reset control line Scan provides the reset control signal at a first potential, the light emission control line EM may provide the light emission control signal at a second potential. At this time, the transistor T09 included in the reset portion 012 may be turned on, and the transistor T06 included in the driving portion 011 may be turned off. Thus, the connection between a second electrode of the transistor T03 (i.e., the driving transistor) and a second electrode of the transistor T06 may be switched off and the connection between the reset power source line Vinit and the driving node N0 is switched on. Accordingly, the reset power source line Vinit may transmit the reset power source signal to the driving node N0 through the transistor T09 which is turned on so as to reset the anode of the light-emitting component L1 connected to the driving node N0. When the reset control line Scan provides the reset control signal at the second potential, the light emission control line EM may provide the light emission control signal at the first potential. At this time, the transistor T06 included in the driving portion 011 may be turned on and the transistor T09 included in the reset portion 012 may be turned off. Thus, the connection between the reset power source line Vinit and the driving node N0 may be switched off and the connection between the second electrode of the transistor T03 (i.e., the driving transistor) and the second electrode of the transistor T06 may be switched on. Accordingly, the light emission driving signal generated by the transistor T03 may be transmitted to the driving node N0 through the transistor T06 which is turned on so as to drive the light-emitting component L1 to emit light. It can be seen therefrom that the compensation circuit 02 provided in the embodiments of the present disclosure compensates for the reset power source signal provided by the reset power source line Vinit connected to the transistor T09 included in the reset portion 012 in FIG. 4.

It should be noted that the driving portion 011 in the driving circuit 01 described in the embodiments of the present disclosure is not limited to the 8T1C structure shown in FIG. 4. For example, in some embodiments, the driving portion may also be of a 6T2C or 7T1C structure.

Optionally, the compensation circuit 02 provided in the embodiments of the present disclosure may compensate for the reset power source signal in a variety of ways, so that the reset power source signals are the same in all periods. This is described in the following embodiments.

Figure 5:
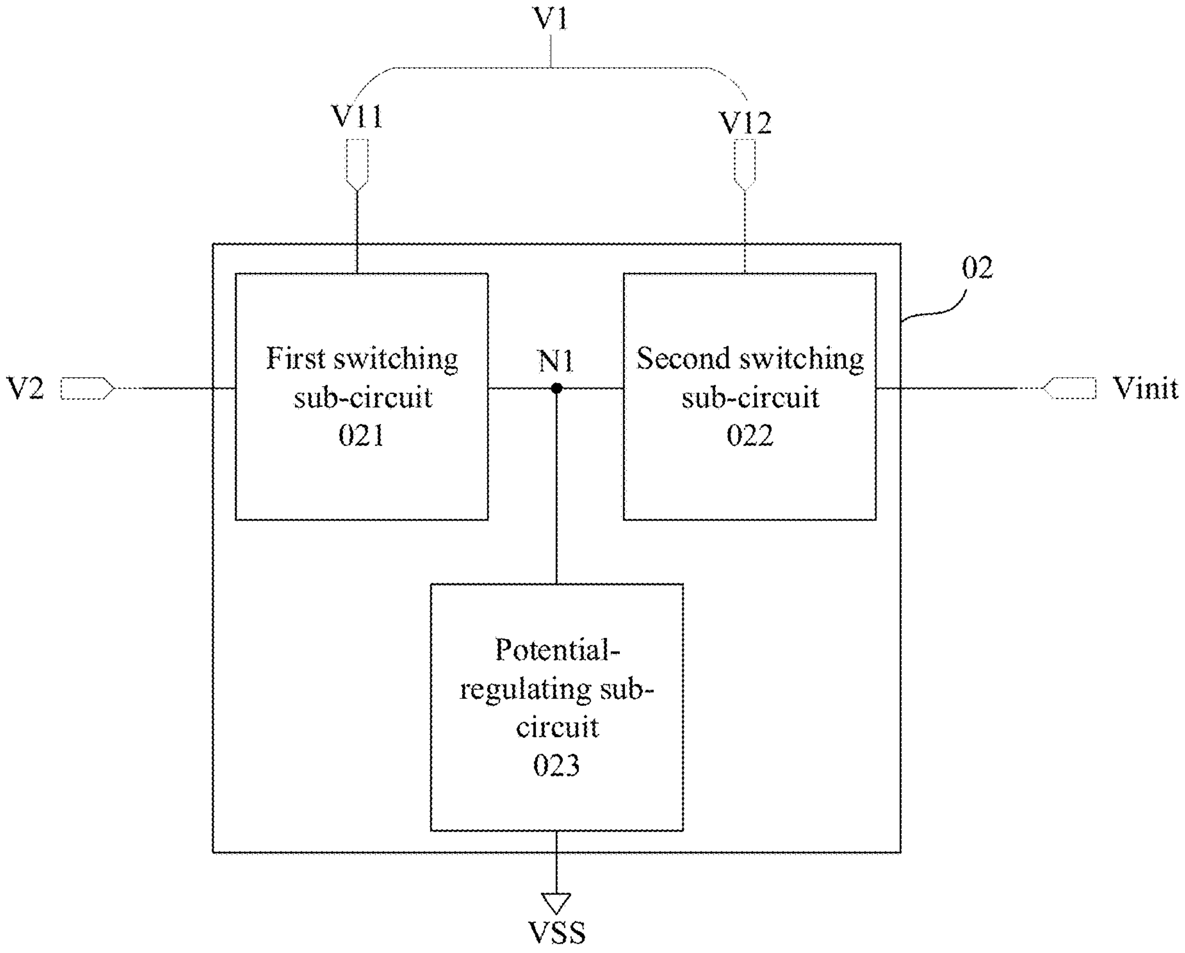
FIG. 5 is a structural schematic diagram of a compensation circuit in the pixel circuit according to embodiments of the present disclosure.

As one alternative embodiment:

referring to FIG. 5, which shows a structural schematic diagram of a compensation circuit, the compensation control line V1 may include a first compensation control line V11 and a second compensation control line V12. A potential of the compensation signal provided by the compensation signal line V2 may be determined based on a potential of the driving node N0 when the light-emitting component L1 emits light at a target greyscale.

The target greyscale here mostly refers to a low greyscale. For example, the potential of the compensation signal V−V2 may satisfy:

$$V-V2=VSS0+Vop\_L1+0-2\ V,$$

wherein VSS0 refers to a potential of the pull-down power source signal provided by the pull-down power source line VSS, Vop_L1 refers to a turn-on voltage required for the light-emitting component L1 to emit light, and 0-2V (volts) refers to a preset adjustable value.

It should be noted that one pixel usually includes a plurality of sub-pixels (such as a red sub-pixel, a green sub-pixel, and a blue sub-pixel), and each sub-pixel may include a pixel circuit and a light-emitting component. If the plurality of sub-pixels in each pixel are compensated respectively, the potentials V−V2 of the compensation signal may be set respectively in a one-to-one corresponding manner. This means that the potentials V−V2 of the compensation signal may be set respectively based on the potentials of the driving node N0 when the light-emitting components L1 in different sub-pixels emit light at the target greyscale. If one pixel including the plurality of sub-pixels is compensated, the potential V−V2 of the compensation signal may be an average of the plurality of sub-pixels, i.e., an average of potentials of compensation signals set for different sub-pixels respectively. In this way, a better compensation effect can be ensured.

On this basis, referring to FIG. 5 continuously, it can be seen that the compensation circuit 02 may further be connected to the equivalent node N1 of the driving node N0 and the pull-down power source line VSS respectively. The compensation circuit 02 is configured to control switching on and off of a connection between the compensation signal line V2 and the equivalent node N1 based on a first compensation control signal provided by the first compensation control line V11, control switching on and off of a connection between the reset power source line Vinit and the equivalent node N1 based on a second compensation control signal provided by the second compensation control line V12, and also regulate a potential of the equivalent node N1 based on the pull-down power source signal provided by the pull-down power source line VSS.

In an exemplary embodiment, the compensation circuit 02 may control the connection between the compensation signal line V2 and the equivalent node N1 to be switched on when a potential of the first compensation control signal provided by the first compensation control line V11 is the first potential, and control the connection between the compensation signal line V2 and the equivalent node N1 to be switched off when the potential of the first compensation control signal provided by the first compensation control line V11 is the second potential. Similarly, the compensation circuit 02 may control the connection between the reset power source line Vinit and the equivalent node N1 to be switched on when a potential of the second compensation control signal provided by the second compensation control line V12 is the first potential, and control the connection between the reset power source line Vinit and the equivalent node N1 to be switched off when the potential of the second compensation control signal provided by the second compensation control line V12 is the second potential.

Optionally, referring to FIG. 5 continuously, it can be seen that the compensation circuit 02 may include:

a first switching sub-circuit 021 which may be connected to the first compensation control line V11, the compensation signal line V2 and the equivalent node N1 respectively, and may be configured to control switching on and off of a connection between the compensation signal line V2 and the equivalent node N1 based the first compensation control signal, wherein in an exemplary embodiment, the first switching sub-circuit 021 may control the connection between the compensation signal line V2 and equivalent node N1 to be switched on when the potential of the first compensation control signal is the first potential, and control the connection between the compensation signal line V2 and the equivalent node N1 to be switched off when the potential of the first compensation control signal is the second potential;

a second switching sub-circuit 022 which may be connected to the second compensation control line V12, the equivalent node N1 and the reset power source line Vinit respectively, and may be configured to control switching on and off of a connection between the reset power source line Vinit and equivalent node N1 based the second compensation control signal, wherein in an exemplary embodiment, the second switching sub circuit 022 may control the connection between the reset power source line Vinit and the equivalent node N1 to be switched on when the potential of the second compensation control signal is the first potential, and control the connection between the reset power source line Vinit and the equivalent node N1 to be switched off when the potential of the second compensation control signal is the second potential; and a potential-regulating sub-circuit 023 which may be connected to the equivalent node N1 and the pull-down power source line VSS respectively, and may be configured to regulate the potential of the equivalent node N1 based the pull-down power source signal.

Figure 6:
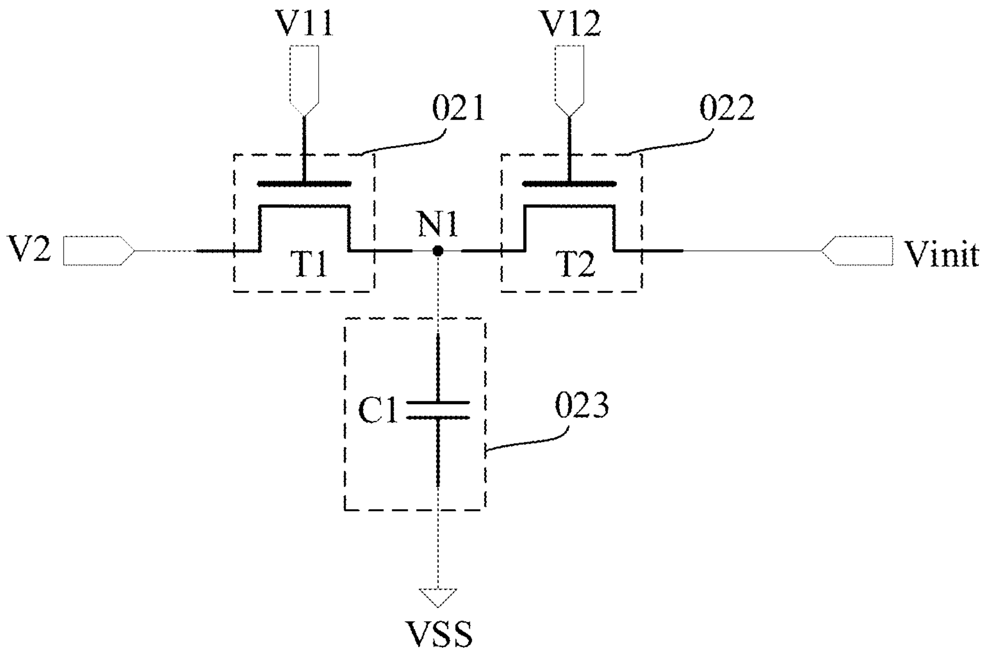
FIG. 6 is a circuit structure diagram of the compensation circuit in the pixel circuit according to embodiments of the present disclosure.

On the basis of FIG. 5, FIG. 6 shows a circuit structure diagram of a compensation circuit. Referring to FIG. 6, it can be seen that the first switching sub-circuit 021 may include a first transistor T1; the second switching sub-circuit 022 may include a second transistor T2; and the potential-regulating sub-circuit 023 may include a capacitor C1.

A gate of the first transistor T1 may be connected to the first compensation control line V11, a first electrode of the first transistor T1 may be connected to the compensation signal line V2, and a second electrode of the first transistor T1 may be connected to the equivalent node N1.

A gate of the second transistor T2 may be connected to the second compensation control line V12, a first electrode of the second transistor T2 may be connected to the reset power source line Vinit, and a second electrode of the second transistor T2 may be connected to the equivalent node N1.

The capacitor C1 may be connected in series between the equivalent node N1 and the pull-down power source line. The capacitor C1 may refer to an equivalent capacitor of the driving node N0.

It should be noted that if the plurality of sub-pixels in each pixel are compensated respectively, capacitance values of the capacitor C1 may be set respectively in a one-to-one corresponding manner. If one pixel including the plurality of sub-pixels is compensated, a capacitance value of the capacitor C1 may be a sum, i.e., a sum of capacitance values set for different sub-pixels respectively. In addition, in some embodiments, on the basis of including a plurality of rows and a plurality of columns of pixels, the capacitance value of the capacitor C1 may be a sum of capacitance values of the equivalent capacitor corresponding to the driving node N0 in all pixels in the same row; or a result acquired by evenly dividing or certainly unevenly dividing the sum of the capacitance values of the equivalent capacitor corresponding to the driving node N0 in all pixels in the same row. In an exemplary embodiment, the sum may be evenly divided into three parts.

It should be noted that the structure shown in FIG. 6 may be regarded as the compensation circuit 02 of a 2T1C (including two transistors and one capacitor) structure. The first transistor T1 and the second transistor T2 may both be P-type transistors.

For the above alternative embodiment, the compensation control signals provided by the first compensation control line V11 and the second compensation control line V12 may be flexibly controlled to simulate a charging and discharging action for the driving node N0, so that finally the reset power source signals provided by the reset power source line Vinit are the same in the Porch period and the refresh period and satisfy the fluctuation situation in FIG. 3, thereby eliminating the problem of abnormal display, i.e., uneven screen splitting. That is to say, in conjunction with FIG. 4, the first compensation control line V11 may simulate the light emission control line EM and is an EM_dum signal line; the second compensation control line V12 may simulate the reset control line Scan and is a Scan_dum signal line; and the compensation signal line V2 may be marked as a V_N0_avr to represent the compensation signal provided based on the set potential of the driving node N0. The above alternative embodiment is similar to equivalent compensation of resistor-capacitance RC.

In an exemplary embodiment, in the refresh period, the first compensation control line V11 and the second compensation control line V12 may both be controlled to provide the compensation control signals at the second potential, so that the first transistor T1 and the second transistor T2 are both turned off, and the reset power source signal provided by the reset power source line Vinit is not compensated. In the Porch period, the first compensation control line V11 and the second compensation control line V12 may be controlled to provide alternately the compensation control signals at the first potential, so that the first transistor T1 and the second transistor T2 are turned on alternately to simulate the action of controlling driving node N0 by the driving circuit 01, thereby reliably compensating for the reset power source signal provided by the reset power source line Vinit and ensuring that the reset power source signal provided in the Porch period is the same as the reset power source signal provided in the refresh period.

Figure 7:
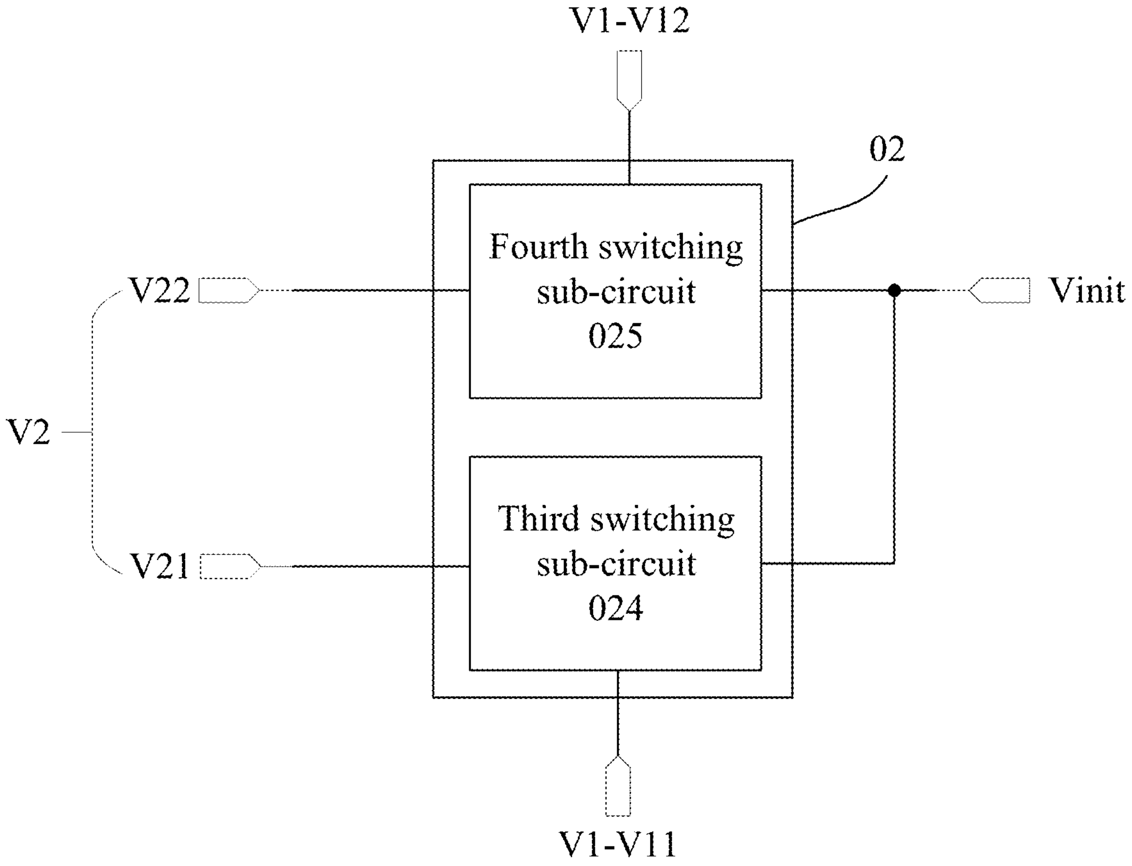
FIG. 7 is a structural schematic diagram of a compensation circuit in another pixel circuit according to embodiments of the present disclosure.

As another alternative embodiment:

referring to FIG. 7, which shows a structural schematic diagram of another compensation circuit, the compensation control line V1 may include a first compensation control line V11 and a second compensation control line V12. The compensation signal line V2 may include a first compensation signal line V21 and a second compensation signal line V22, a compensation signal provided by the first compensation signal line V21 is the reset power source signal provided by the reset power source line Vinit in the refresh period, and the reset power source signal provided by the reset power source line Vinit is controlled to be the same as the compensation signal provided by the first compensation signal line V21 based on a compensation signal provided by the second compensation signal line V22.

On this basis, the compensation circuit 02 may be configured to control switching on and off of a connection between the first compensation signal line V21 and the reset power source line Vinit based on a first compensation control signal provided by the first compensation control line V11, and control switching on and off of a connection between the second compensation control line V22 and the reset power source line Vinit based on a second compensation control signal provided by the second compensation control line V12.

In an exemplary embodiment, the compensation circuit 02 may control the connection between the first compensation signal line V21 and the reset power source line Vinit to be switched on when a potential of the first compensation control signal provided by the first compensation control line V11 is the first potential, so that the compensation signal provided by the first compensation signal line V21 is transmitted to the reset power source line Vinit; and control the connection between the first compensation signal line V21 and the reset power source line Vinit to be switched off when the potential of the first compensation control signal provided by the first compensation control line V11 is the second potential. Similarly, the compensation circuit 02 may control the connection between the second compensation signal line V22 and the reset power source line Vinit to be switched on when the potential of the second compensation control signal provided by the second compensation control line V12 is the first potential, so that the compensation signal provided by the second compensation signal line V22 is transmitted to the reset power source line Vinit, and control the connection between the second compensation signal line V22 and the reset power source line Vinit to be switched off when the potential of the second compensation control signal provided by the second compensation control line V22 is the second potential.

Optionally, referring to FIG. 7 continuously, it can be seen that the compensation circuit 02 may include:

a third switching sub-circuit 024 which may be connected to the first compensation control line V11, the first compensation signal line V21 and the reset power source line Vinit respectively, and may be configured to control switching on and off of a connection between the first compensation signal line V21 and the reset power source line Vinit based on the first compensation control signal, wherein in an exemplary embodiment, the third switching sub-circuit 024 may control the connection between the first compensation signal line V21 and the reset power source line Vinit to be switched on when the potential of the first compensation control signal is the first potential, and control the connection between the first compensation signal line V21 and the reset power source line Vinit to be switched off when the potential of the first compensation control signal is the second potential; and a fourth switching sub-circuit 025 which may be connected to the second compensation control line V12, the second compensation signal line V22 and the reset power source line Vinit respectively, and may be configured to control switching on and off of a connection between the second compensation signal line V22 and the reset power source line Vinit based on the second compensation control signal, wherein in an exemplary embodiment, the fourth switching sub-circuit 025 may control the connection between the second compensation signal line V22 and the reset power source line Vinit to be switched on when the potential of the second compensation control signal is the first potential, and control the connection between the second compensation signal line V22 and the reset power source line Vinit to be switched off when the potential of the second compensation control signal is the second potential.

Figure 8:
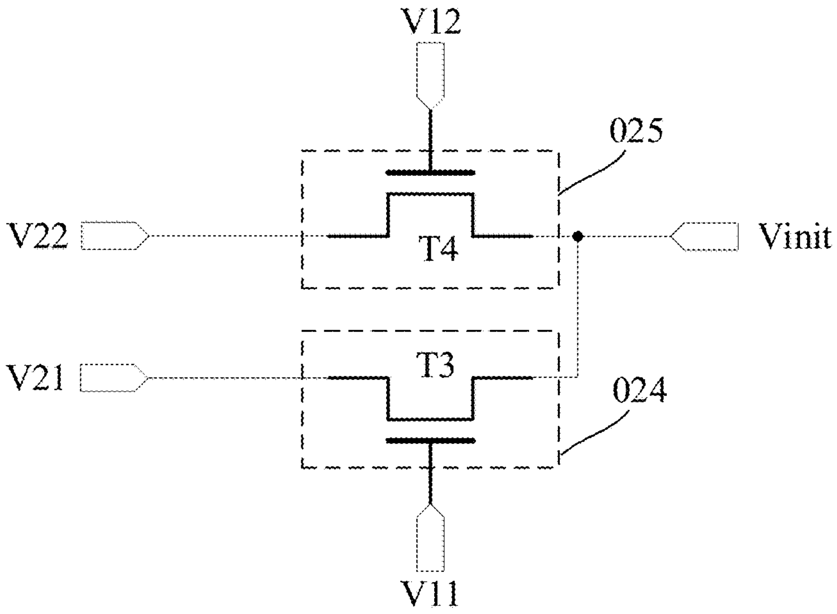
FIG. 8 is a circuit structure diagram of the compensation circuit in the another pixel circuit according to embodiments of the present disclosure.

On the basis of FIG. 7, FIG. 8 shows a circuit structure diagram of still another compensation circuit. Referring to FIG. 8, it can be seen that the third switching sub-circuit 024 may include a third transistor T3; and the fourth switching sub-circuit 025 may include a fourth transistor T4.

A gate of the third transistor T3 may be connected to the first compensation control line V11, a first electrode of the third transistor t3 may be connected to the first compensation signal line V21, and a second electrode of the third transistor T3 may be connected to the reset power source line Vinit.

A gate of the fourth transistor T4 may be connected to the second compensation control line V12, a first electrode of the fourth transistor T4 may be connected to the second compensation signal line V22, and a second electrode of the fourth transistor T4 may be connected to the reset power source line Vinit.

It should be noted that the structure shown in FIG. 8 may be regarded as the compensation circuit 02 of a 2T (including two transistors) structure. The third transistor T3 and the fourth transistor T4 may both be P-type transistors.

For another alternative embodiment above, the compensation signal provided by the second compensation signal line V22 and the compensation signal provided by the first compensation signal line V21 may be the same, which may mean that the potential averages are the same. Thus, by flexibly controlling the compensation control signals provided by the first compensation control line V11 and the second compensation control line V12, the required reset power source signal (i.e., the first compensation signal) may be transmitted to the reset power source line Vinit in the refresh period and the required reset power source signal (i.e., the second compensation signal) may be transmitted to the reset power source line Vinit in the Porch period. The another alternative embodiment described above is similar to power source switching.

In an exemplary embodiment, in the refresh period, the first compensation control line V11 may be controlled to provide the first compensation control signal at the first potential and meanwhile the second compensation control line V12 may be controlled to provide the second compensation control signal at the second potential, so that the third transistor T3 is turned on and the fourth transistor T4 is turned off, and then the compensation signal provided by the first compensation signal line V21 may be transmitted to the reset power source line Vinit through the third transistor T3 which is turned on. In the Porch period, the second compensation control line V22 may be controlled to provide the second compensation control signal at the first potential and meanwhile the first compensation control line V11 may be controlled to provide the first compensation control signal at the second potential, so that the fourth transistor T4 is turned on and the third transistor T3 is turned off, and then the compensation signal provided by the second compensation signal line V22 may be transmitted to the reset power source line Vinit through the fourth transistor T4 which is turned on. Thus, it is ensured that the reset power source signal provided in the Porch period is the same as the reset power source signal provided in the refresh period.

As still another alternative embodiment:

in some embodiments, the compensation signal provided by the second compensation signal line V22 and the compensation signal provided by the first compensation signal line V21 may be different. For example, the second compensation signal line V22 may be a grounding line GND. On this basis, in conjunction with FIG. 7 and FIG. 9 which shows a structural schematic diagram of yet still another compensation circuit, it can be seen that the compensation circuit 02 described in the embodiments of the present disclosure may further include a voltage-dividing sub-circuit 026 connected in series between the second compensation signal line V22 and the fourth switching sub-circuit 025, so that effective voltage dividing is achieved through the voltage-dividing sub-circuit 026.

Figure 9:
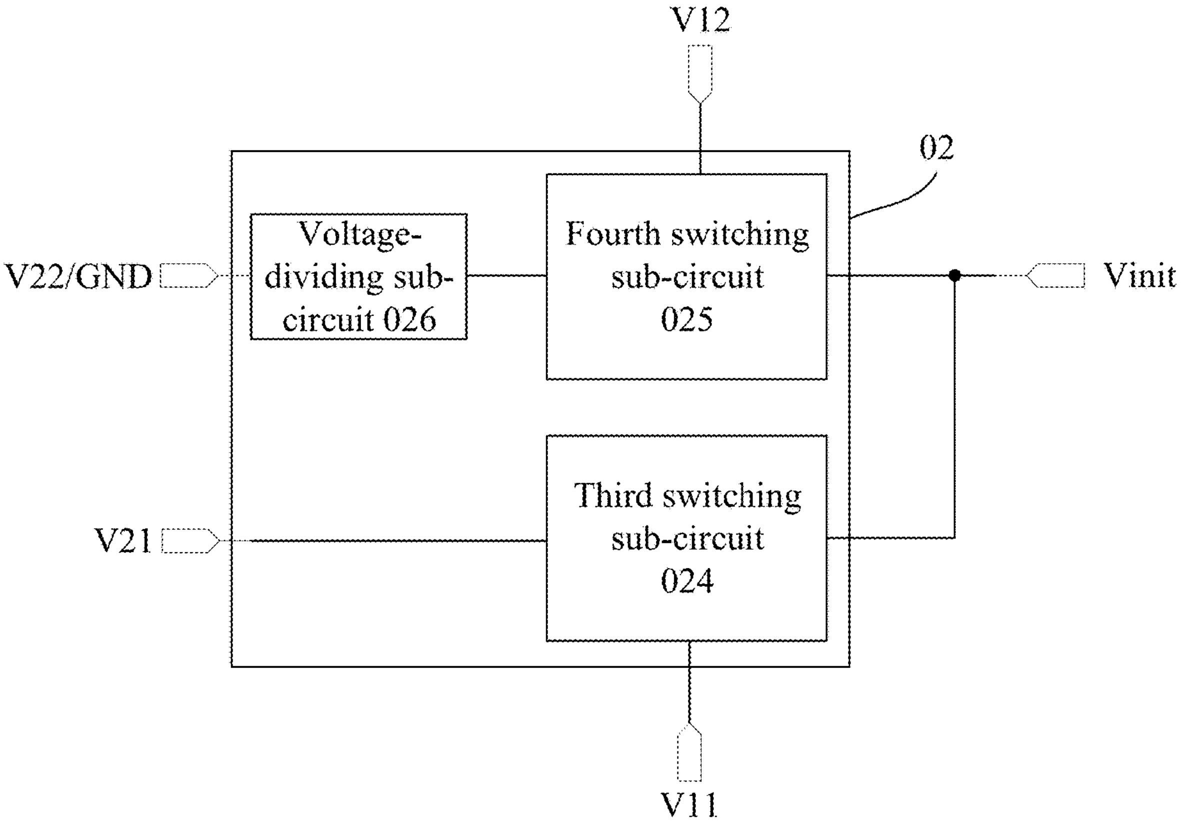
FIG. 9 is a structural schematic diagram of a compensation circuit in still another pixel circuit according to embodiments of the present disclosure.
Figure 10:
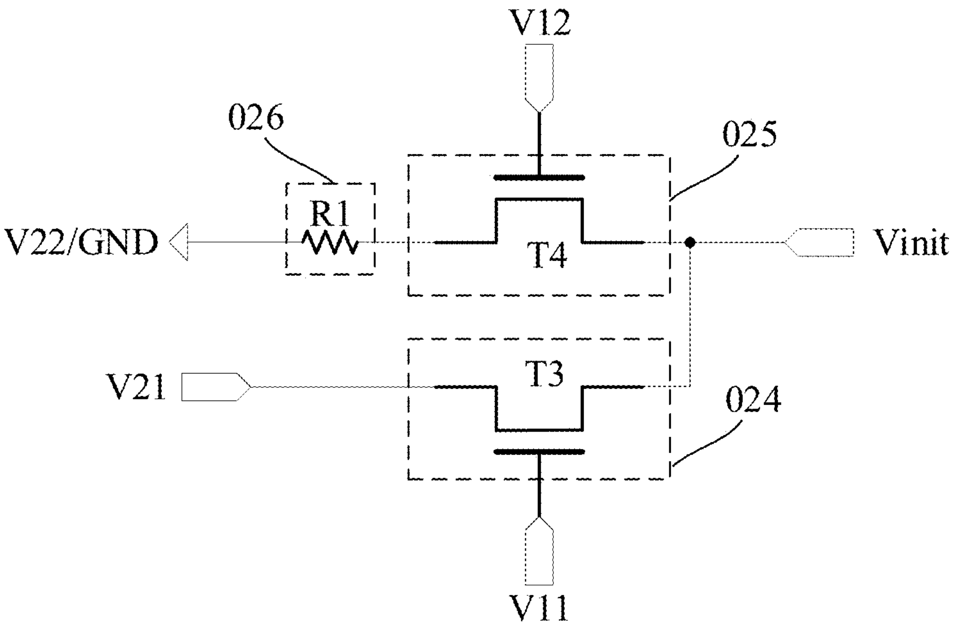
FIG. 10 is a circuit structure diagram of the compensation circuit in still another pixel circuit according to embodiments of the present disclosure.

On the basis of FIG. 9, in conjunction with FIG. 8, FIG. 10 shows a circuit structure diagram of yet still another compensation circuit. Referring to FIG. 10, it can be seen that the voltage-dividing sub-circuit 026 may include a voltage-dividing resistor R1.

In addition, the voltage-dividing resistor R1 may be connected in series between the second compensation signal line V22 and the first electrode of the fourth transistor T4.

It should be noted that the structure shown in FIG. 10 may be regarded as the compensation circuit 02 of a 2T1R (including two transistors and one resistor) structure.

For the still another alternative embodiment described above, a control mode thereof may be the same as that for the another alternative embodiment described above only except that when the fourth transistor T4 is controlled to be turned on and meanwhile the third transistor T3 is controlled to be turned off, the reset power source signal transmitted to the reset power source line Vinit may be subjected to voltage division between the compensation signal provided by the first compensation signal line V21 and the signal provided by the grounding line GND, so as to achieve the purpose of compensating for the reset power source signal. The still another alternative embodiment described above is similar to voltage switching.

That is, in the embodiments of the present disclosure, by performing equivalent RC compensation, power source switching, or voltage compensation on the driving node N0, the reset power source signal provided by the reset power source line Vinit in the Porch period can be the same as the reset power source signal provided by the reset power source line Vinit in the refresh period, thereby avoiding the problem of poor display, i.e., uneven screen splitting, caused by the relatively poor stability of the potential of the reset power source signal. Certainly, the plurality of embodiments above are all only schematically illustrated. In some other embodiments, the compensation circuit 02 may also be designed to satisfy other structures as long as the above compensation effect can be achieved.

Optionally, each transistor in the pixel circuit provided by the embodiments of the present disclosure may include an active layer Act, a gate metal layer GT and a source-drain metal layer SD which are successively stacked.

Figure 11:
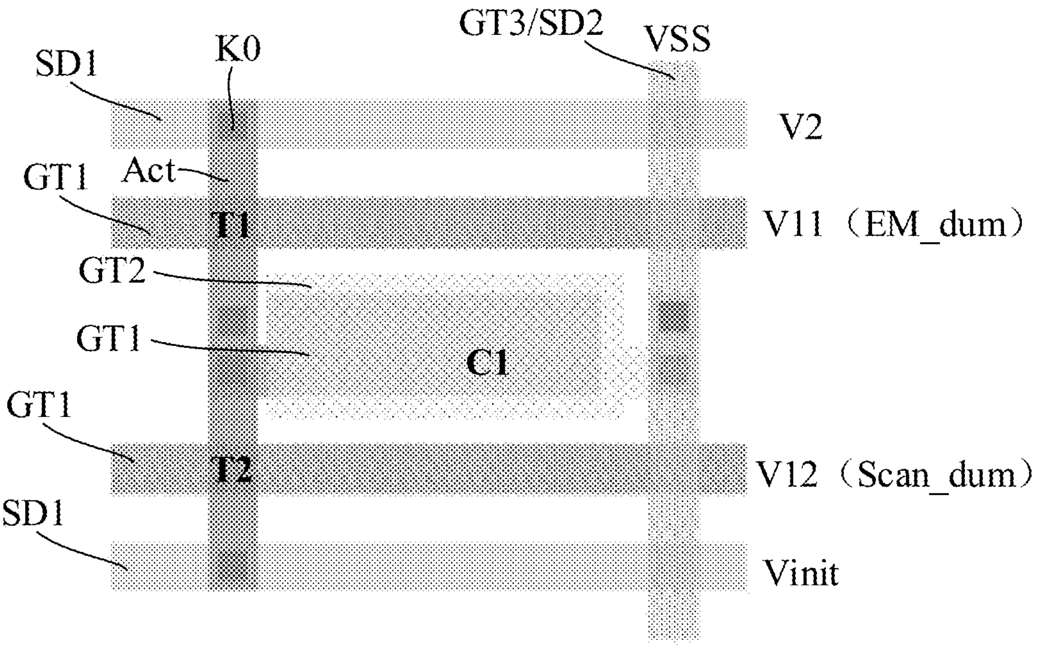
FIG. 11 is a structural layout of the compensation circuit in the pixel circuit according to embodiments of the present disclosure.

On this basis, by taking the structure shown in FIG. 6 as an example, FIG. 11 shows a structural layout of a compensation circuit 02. Referring to FIG. 11, it can be seen that the active layer Act of the transistor in the compensation circuit 02 may extend along a first direction X1. The compensation control line V1 and the compensation signal line V2 which are connected to the compensation circuit 02 may both extend along a second direction X2, and the compensation control line V1 and the gate metal layer GT may be disposed in the same layer. The compensation signal line V2 and the source-drain metal layer SD may be disposed in the same layer. The compensation control line V1 may include an EM_dum signal line (i.e., the first compensation control line V11) simulating the light emission control line EM and a Scan_dum signal line (i.e., the second compensation control line V12) simulating the reset control line Scan.

In addition, FIG. 11 also shows the pull-down power source line VSS, the capacitor C1 and the reset power source line Vinit. The pull-down power source line VSS may extend along the first direction X1 and is disposed in the same layer with the gate metal layer GT or the source-drain metal layer SD. The capacitor C1 may be disposed in the same layer with the gate metal layer GT. The reset power source line Vinit may extend along the second direction X2 and is disposed in the same layer with the source-drain metal layer SD. Referring to FIG. 11, it can also be seen that a plurality of via holes K0 may formed in the active layer Act for lapping of the upper and lower layers.

Optionally, in some embodiments, the gate metal layer GT may include three gate metal layers, i.e., GT1, GT2 and GT3, that are stacked sequentially; and the source-drain metal layer SD may include two source-drain metal layers, i.e., SD1 and SD2 that are stacked sequentially. The first compensation control line V11 and the second compensation control line V12 may both be disposed in the same layer with the gate metal layer GT1. The compensation signal line V2 and the reset power source line Vinit may both be disposed in the same layer with the source-drain metal layer SD1. The capacitor C1 may include the gate metal layers GT1 and GT2. The pull-down power source line VSS may be disposed in the same layer with the gate metal layer GT3 or the source-drain metal layer SD2.

The second direction X2 may intersect with the first direction X1. For example, referring to FIG. 11, the second direction X2 is perpendicular to the first direction X1. On this basis, it can also be seen that the compensation control line V1, the compensation control line V2 and the reset power source line Vinit may be arranged transversely as shown in FIG. 11; and the pull-down power source line VSS and the active layer Act may be arranged vertically as shown in FIG. 11. In this way, in compunction with the embodiment in which the layout of a relatively thin gate metal layer GT is used, it can be seen that the embodiments of the present disclosure can effectively reduce the wiring area.

It should be noted that the expression being in the same layer may refer to a layer structure formed by forming a film layer for forming a specific pattern by using the same film-forming process and then patterning the film layer with the same mask through a one-time patterning process. According to different particular patterns, the one-time patterning process may include multiple exposures, developments, or etching processes, and the specific pattern in the formed layer structure may be continuous or discontinuous. That is, a plurality of components, components, structures and/or sections disposed in the "same layer" are made of the same material and formed by the same patterning process. In this way, the preparation process and preparation costs can be reduced, and the preparation efficiency can be improved.

In summary, the embodiments of the present disclosure provide a pixel circuit. The pixel circuit includes the driving circuit and the compensation circuit. The driving circuit can transmit the reset power source signal to the driving node to reset the light-emitting component connected to the driving node; and can transmit the light emission driving signal to the driving node to drive the light-emitting component connected to the driving node to emit light. The compensation circuit can control the reset power source line to provide the same reset power source signal at any period, that is, ensure that the stability of the potential of the reset power source signal transmitted to the driving node is better. In this way, even if the light-emitting component is charged and discharged multiple times within one frame, reliable reset of the light-emitting component can be ensured, thereby avoiding abnormal display, i.e., uneven screen splitting, of a display panel and ensuring a better display effect.

Figure 12:
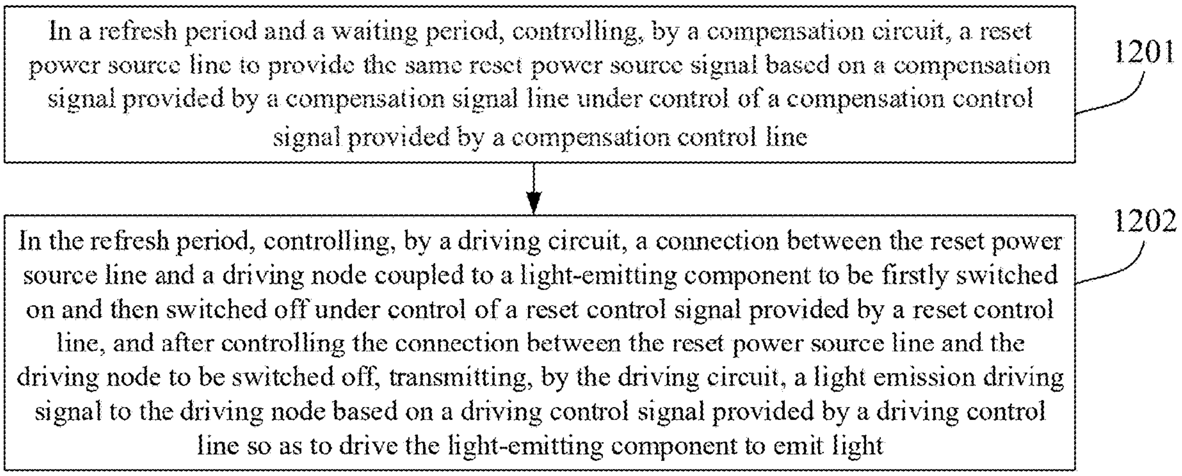
FIG. 12 is a flowchart of a driving method for a pixel circuit according to embodiments of the present disclosure.

FIG. 12 is a flowchart of a driving method for a pixel circuit according to embodiments of the present disclosure, which is applicable to the pixel circuit as described in the above embodiments. As shown in FIG. 12, the method includes a plurality of refresh periods that are executed sequentially, and waiting (Porch) periods between every two adjacent refresh periods.

Referring to step 1201, in the refresh period and the waiting period, a compensation circuit controls a reset power source line to provide the same reset power source signal based on a compensation signal provided by a compensation signal line under control of a compensation control signal provided by a compensation control line.

Referring to step 1202, in the refresh period, a driving circuit controls a connection between the reset power source line and a driving node connected to a light-emitting component to be firstly switched on and then switched off under control of a reset control signal provided by a reset control line, and after controlling the connection between the reset power source line and the driving node to be switched off, transmits a light emission driving signal to the driving node based on a driving control signal provided by a driving control line so as to drive the light-emitting component to emit light.

Certainly, in the Porch period, the driving circuit may also control the connection between the reset power source line and the driving node to be switched on connected to the light-emitting component under control of the reset control signal provided by the reset control line, so that the reset power source line transmits the reset power source signal to the driving node to reset the driving node.

It should be noted that FIG. 12 only shows method steps, but does not limit an execution order of the steps.

Optionally, for alternative embodiments shown in FIG. 5 and FIG. 6, a compensation control line V1 includes a first compensation control line V11 and a second compensation control line V12. A potential of the compensation signal may be determined based on a potential of the driving node when the light-emitting component emits light at a target greyscale. On this basis, step 1201 above that the compensation circuit controls the reset power source line to provide the same reset power source signal based on the compensation signal provided by the compensation signal line under control of the compensation control signal provided by the compensation control line may include:

A1, in the refresh period, the compensation circuit controls both a connection between the compensation signal line and an equivalent node of the driving node and a connection between the reset power source line and the equivalent node to be switched off under control of a first compensation control signal provided by the first compensation control line and a second compensation control signal provided by the second compensation control line; and A2, in the waiting period, the compensation circuit controls the connection between the compensation signal line and the equivalent node and the connection between the reset power source line and the equivalent node to be alternately switched on under control of the first compensation control signal and the second compensation control signal so as to control the reset power source line to provide the same reset power source signal in both the refresh period and the waiting period.

Figure 13:
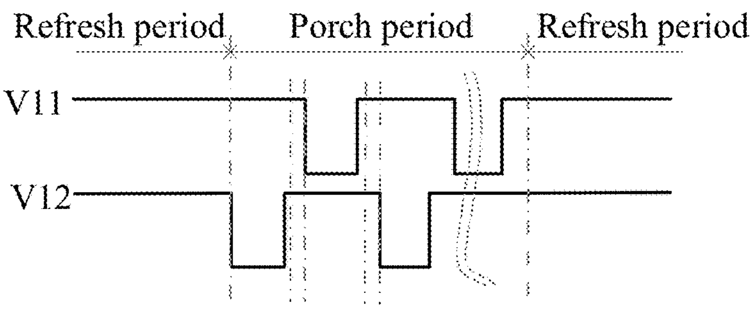
FIG. 13 is a sequence diagram of a compensation control signal according to embodiments of the present disclosure.

Optionally, by taking the structure shown in FIGS. 5 and 6, the transistor being a P-type transistor, the first potential (i.e., an effective potential) being low, and the second potential (i.e., the ineffective potential) being high as an example, FIG. 13 shows a sequence diagram of a compensation control signal.

Referring to FIG. 13, it can be seen that in the refresh period, the first compensation control line V11 may be controlled to provide the first compensation control signal at the high potential and meanwhile the second compensation control line V12 may be controlled to provide the second compensation control signal at the high potential. Accordingly, the first transistor T1 and the second transistor T2 are both turned off, and thus both the connection between the compensation signal line V2 and the equivalent node N1 and the connection between the reset power source line Vinit and the equivalent node N1 are switched off. In the Porch period, the first compensation control line V11 and the second compensation control line V12 may be controlled to alternately provide compensation control signals at the low potential. That is, as shown in FIG. 13, the second compensation control line V12 is firstly controlled to provide the second compensation control signal at the low potential and meanwhile the first compensation control line V11 is controlled to provide the first compensation control signal at the high potential; then the first compensation control line V11 is controlled to the provide the first compensation control signal at the low potential and meanwhile the second compensation control line V12 is controlled to provide the second compensation control signal at the high potential; and so on. An alternating time interval here may be consistent with an adjacent phase difference of the reset control signal that resets the driving node N0 in the driving circuit 01. For example, if line-by-line scanning is performed, it may be a charging time for one line, i.e., 1H; if every two lines are driven at the same time, it may be a charging time of the two lines, i.e., 2H; and so on, thereby achieving the process of equivalently charging and discharging the driving node N0, and ensuring that the fluctuation amplitudes of the reset power source signal provided by the reset power source line Vinit are the same in the refresh period and the Porch period. Thus, the problem of poor display, i.e., uneven screen splitting, is eliminated.

Optionally, for another alternative embodiments shown in FIG. 7 and FIG. 8 or still another alternative embodiments shown in FIG. 9 and FIG. 10, a compensation control line V1 may include a first compensation control line V11 and a second compensation control line V12. The compensation signal line V2 may include a first compensation signal line V21 and a second compensation signal line V22. In addition, a compensation signal provided by the first compensation signal line V21 is the reset power source signal provided by the reset power source line Vinit in the refresh period, and the reset power source signal provided by the reset power source line Vinit is controlled to be the same as the compensation signal provided by the first compensation signal line V21 based on a compensation signal provided by the second compensation signal line V22. On this basis, step 1201 above that the compensation circuit controls the reset power source line to provide the same reset power source signal based on the compensation signal provided by the compensation signal line under control of the compensation control signal provided by the compensation control line may include:

B1, in the refresh period, the compensation circuit controls a connection between the first compensation signal line and the reset power source line to be switched on under control of a first compensation control signal provided by the first compensation control line, and controls a connection between the second compensation signal line and the reset power source line to be switched off under control of a second compensation control signal provided by the second compensation control line; and B2, in the waiting period, the compensation circuit controls the connection between the second compensation signal line and the reset power source line to be switched on under control of the second compensation control signal, and controls the connection between the first compensation signal line and the reset power source line to be switched off under control of the first compensation control signal.

Figure 14:
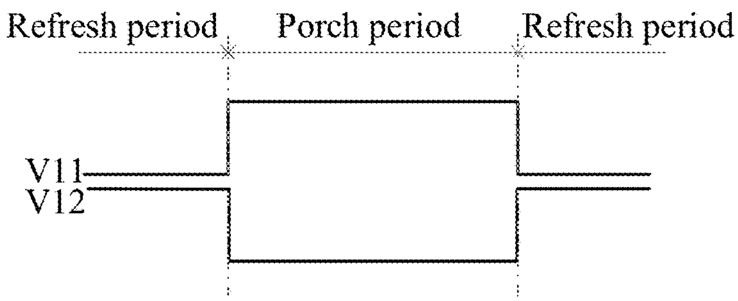
FIG. 14 is a sequence diagram of another compensation control signal according to embodiments of the present disclosure.

Optionally, by taking the structure shown in FIG. 7 and FIG. 8 or FIG. 9 and FIG. 10, the transistor being a P-type transistor, the first potential (i.e., the effective potential) being low, and the second potential (i.e., the ineffective potential) being high as an example, FIG. 14 shows a sequence diagram of another compensation control signal.

Referring to FIG. 14, it can be seen that in the refresh period, the first compensation control line V11 may be controlled to provide the first compensation control signal at the low potential and meanwhile the second compensation control line V12 may be controlled to provide the second compensation control signal at the high potential. Accordingly, the third transistor T3 may be turned on and the fourth transistor T4 may be turned off. Thus, the compensation signal provided by the first compensation signal line V21 may be transmitted to the reset power source line Vinit through the third transistor T3 which is turned on. In the Porch period, the second compensation control line V12 may be controlled to provide the second compensation control signal at the low potential and meanwhile the first compensation control line V11 is controlled to provide the first compensation control signal at the high potential. Accordingly, the fourth transistor T4 is turned on and the third transistor T3 is turned off. On this basis, for the structure show in FIG. 7 and FIG. 8, the compensation signal provided by the second compensation signal line V22 may be transmitted to the reset power source line Vinit through the fourth transistor T4 which is turned on. For the structure show in FIG. 9 and FIG. 10, the reset power source signal provided by the reset power source line Vinit at this time may be subjected to voltage division between the compensation signal provided by the first compensation signal line V21 and the signal provided by the grounding line GND. Finally, it ensures that the reset power source line is controlled to provide the same reset power source signal in the refresh period and the Porch period, thereby eliminating the problem of poor display, i.e., uneven screen splitting.

Because the driving method may have basically the same technical effects as the pixel circuit described in the preceding embodiments, the technical effects of the driving method are not repeated herein for the purpose of brevity.

Figure 15:
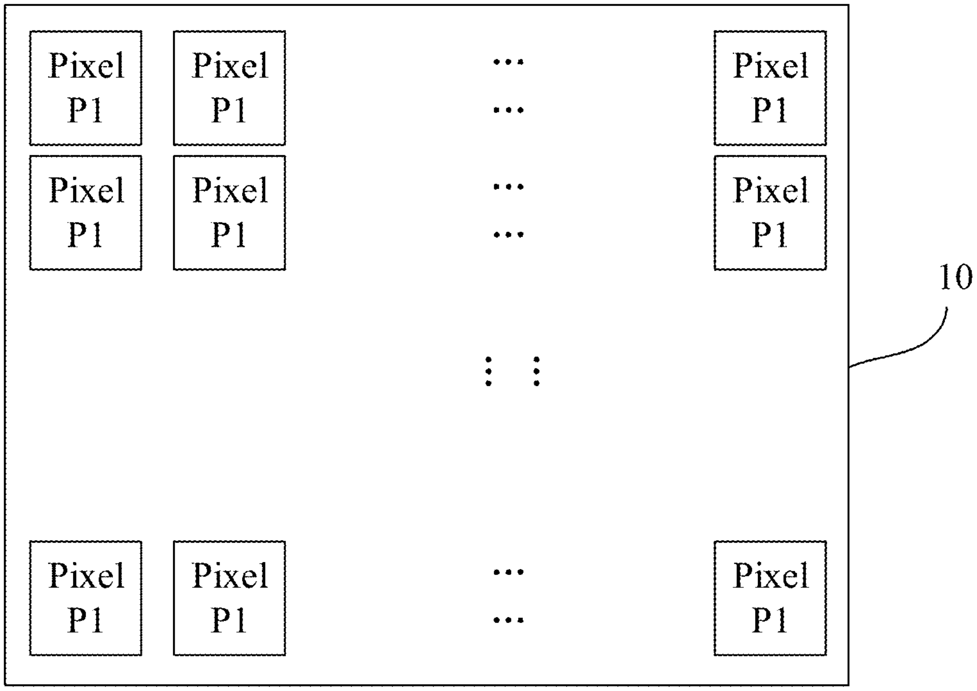
FIG. 15 is a structural schematic diagram of a display panel according to embodiments of the present disclosure.

FIG. 15 is a structural schematic diagram of a display panel according to embodiments of the present disclosure. As shown in FIG. 15, the display panel includes a substrate 10, and pixels P1 disposed on the substrate 10.

The pixel P1 includes a light-emitting component L1 (not shown in FIG. 15) and the pixel circuit as described in the above embodiments. The pixel circuit is connected to the light-emitting component L1 and is configured to drive the light-emitting component L1 to emit light.

Figure 16:
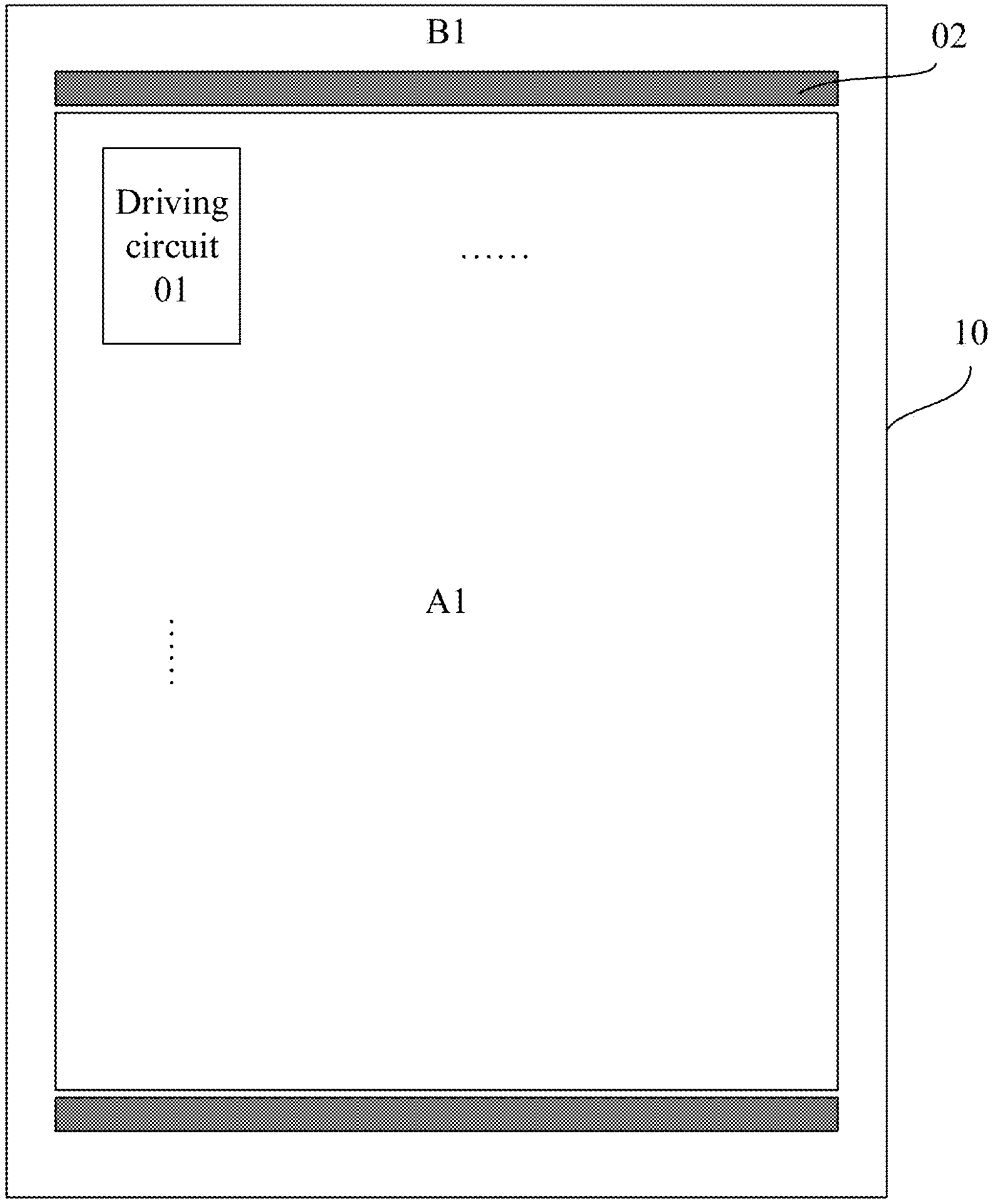
FIG. 16 is a structural schematic diagram of another display panel according to embodiments of the present disclosure.

Optionally, FIG. 16 is a structural schematic diagram of another display panel according to embodiments of the present disclosure. Referring to FIG. 16, it can be seen that the substrate 10 may include a display region A1 and a non-display region B1 which are adjacent. As shown in FIG. 16, the non-display region B1 surrounds the display region A1.

In conjunction with FIG. 1, the driving circuit 01 included in the pixel circuit may be disposed in the display region A1, and the compensation circuit 02 included in the pixel circuit may be disposed in the non-display region B1. For example, in some embodiments, referring to FIG. 16, the compensation circuit 02 may be disposed at upper and lower ends or left and right ends of the display region A1. A plurality of pixels P1 may share the same compensation circuit 02. In this way, narrow frame design is facilitated without affecting the resolution of display region A1.

Because the display panel may have basically the same technical effects as the pixel circuit described in the preceding embodiments, the technical effects of the display panel are not repeated herein for the purpose of brevity.

Figure 17:
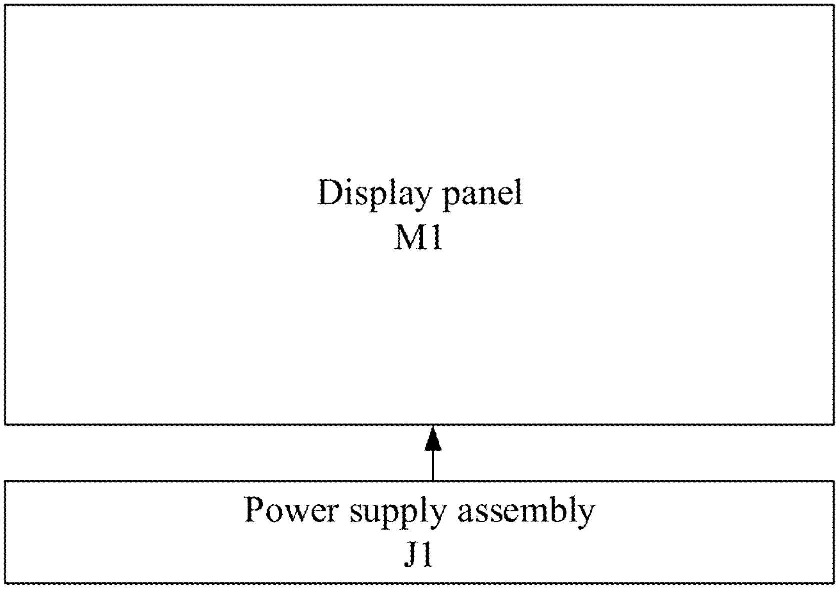
FIG. 17 is a structural schematic diagram of a display device according to embodiments of the present disclosure.

FIG. 17 is a structural schematic diagram of a display device according to embodiments of the present disclosure. As shown in FIG. 17, the display device includes a power supply assembly J1 and the display panel M1 as descried in the above embodiments.

The power supply assembly J1 is connected to the display panel M1 and is configured to supply power to the display panel M1.

Optionally, the display device may be any product or component having a display function such as an organic light-emitting diode (OLED) display device, an active-matrix organic light-emitting diode (AMOLED) display device, and a liquid crystal display device.

The AMOLED display device is low in power consumption and has a wide operating temperature range, a low cost, a high contrast, a wide viewing angle, the wide color gamut and a relatively thin display panel, and thus can achieve flexible display and gradually become the next-generation display "crown". The OLED display device may meet most of requirements of today's information age for high performance and high capacity of display devices, may be used for indoor and outdoor lighting, may be used as a wallpaper decoration, can be made into foldable electronic newspapers, and can also be applied to portable electronic products such as mobile phones, tablet computers and wearable electronic devices.

It should be noted that the terms used in the embodiments of the present disclosure are merely intended to explain the embodiments, instead of limiting the present disclosure. Unless defined otherwise, the technical terms or scientific terms used in the embodiments of the present disclosure shall have the general meaning understood by persons of ordinary skill in the art.

For example, the terms "first", "second", "third" and similar terms used in the description and claims of the present disclosure do not denote any order, quantity, or importance, and are merely used to distinguish between different components. The word "connected" or "coupled" refers to an electrical connection.

Likewise, the term "one" or "a/an" and similar terms denote at least one, instead of limiting the quantity.

The word "comprise" or "include" and similar terms mean that the component or object appearing before the word "comprise" or "include" covers the listed components, objects and equivalents thereof appearing after the word "comprise" or "include", without excluding other components or objects.

The terms "upper", "lower", "left", right" and the like are used to indicate a relative positional relationship. When an absolute position of the described object changes, the relative positional relationship is also changed accordingly.

The above descriptions are only exemplary embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A pixel circuit, comprising:

a driving circuit which is respectively connected to a driving control line, a reset control line, a reset power source line and a driving node and is configured to: transmit a light emission driving signal to the driving node based on a driving control signal provided by the driving control line; and control switching on and off of a connection between the reset power source line and the driving node under control of a reset control signal provided by the reset control line, the driving node being configured to be connected to a light-emitting component; and a compensation circuit which is respectively connected to a compensation control line, a compensation signal line and the reset power source line, and is configured to control the reset power source line to provide the same reset power source signal at any period based on a compensation signal provided by the compensation signal line under control of a compensation control signal provided by the compensation control line;

wherein the compensation control line comprises a first compensation control line and a second compensation control line; a potential of the compensation signal provided by the compensation signal line is determined based on a potential of the driving node when the light-emitting component emits light at a target greyscale;

the compensation circuit is further respectively connected to an equivalent node of the driving node and a pull-down power source line connected to the light-emitting component; the compensation circuit is configured to control switching on and off of a connection between the compensation signal line and the equivalent node based on a first compensation control signal provided by the first compensation control line, control switching on and off of a connection between the reset power source line and the equivalent node based on a second compensation control signal provided by the second compensation control line, and regulate a potential of the equivalent node based on a pull-down power source signal provided by the pull-down power source line; and the driving node is configured to be connected to a first electrode of the light-emitting component, and a second electrode of the light-emitting component is connected to the pull-down power source line.

2. The pixel circuit according to claim 1, wherein the compensation circuit comprises:

a first switching sub-circuit which is respectively connected to the first compensation control line, the compensation signal line and the equivalent node, and is configured to control the switching on and off of the connection between the compensation signal line and the equivalent node based on the first compensation control signal;

a second switching sub-circuit which is respectively connected to the second compensation control line, the equivalent node and the reset power source line, and is configured to control the switching on and off of the connection between the reset power source line and the equivalent node based on the second compensation control signal; and a potential-regulating sub-circuit which is respectively connected to the equivalent node and the pull-down power source line, and is configured to regulate the potential of the equivalent node based on the pull-down power source signal.

3. The pixel circuit according to claim 2, wherein the first switching sub-circuit comprises a first transistor, the second switching sub-circuit comprises a second transistor, and the potential-regulating sub-circuit comprises a capacitor, wherein a gate of the first transistor is connected to the first compensation control line, a first electrode of the first transistor is connected to the compensation signal line, and a second electrode of the first transistor is connected to the equivalent node;

a gate of the second transistor is connected to the second compensation control line, a first electrode of the second transistor is connected to the reset power source line, and a second electrode of the second transistor is connected to the equivalent node; and the capacitor is connected between the equivalent node and the pull-down power source line.

4. A pixel circuit, comprising:

a driving circuit which is respectively connected to a driving control line, a reset control line, a reset power source line and a driving node and is configured to: transmit a light emission driving signal to the driving node based on a driving control signal provided by the driving control line; and control switching on and off of a connection between the reset power source line and the driving node under control of a reset control signal provided by the reset control line, the driving node being configured to be connected to a light-emitting component; and a compensation circuit which is respectively connected to a compensation control line, a compensation signal line and the reset power source line, and is configured to control the reset power source line to provide the same reset power source signal at any period based on a compensation signal provided by the compensation signal line under control of a compensation control signal provided by the compensation control line;

wherein the compensation control line comprises: a first compensation control line and a second compensation control line; the compensation signal line comprises: a first compensation signal line and a second compensation signal line; a compensation signal provided by the first compensation signal line is a reset power source signal provided by the reset power source line in a refresh period, and the reset power source signal provided by the reset power source line is controlled to be the same as the compensation signal provided by the first compensation signal line based on a compensation signal provided by the second compensation signal line; and the compensation circuit is configured to control switching on and off of a connection between the first compensation signal line and the reset power source line based on a first compensation signal provided by the first compensation control line, and control switching on and off of a connection between the second compensation signal line and the reset power source line based on a second compensation control signal provided by the second compensation control line.

5. The pixel circuit according to claim 4, wherein the compensation circuit comprises:

a third switching sub-circuit which is respectively connected to the first compensation control line, the first compensation signal line and the reset power source line, and is configured to control the switching on and off of the connection between the first compensation signal line and the reset power source line based on the first compensation control signal; and a fourth switching sub-circuit which is respectively connected to the second compensation control line, the second compensation signal line and the reset power source line, and is configured to control the switching on and off of the connection between the second compensation signal line and the reset power source line based on the second compensation control signal.

6. The pixel circuit according to claim 5, wherein the compensation signal provided by the second compensation signal line is the same as the compensation signal provided by the first compensation signal line;

or the compensation signal provided by the second compensation signal line is different from the compensation signal provided by the first compensation signal line, and the compensation circuit further comprises: a voltage-dividing sub-circuit connected between the second compensation signal line and the fourth switching sub-circuit.

7. The pixel circuit according to claim 6, wherein the third switching sub-circuit comprises a third transistor, the fourth switching sub-circuit comprises a fourth transistor, and the voltage-dividing sub-circuit comprises a voltage-dividing resistor, wherein a gate of the third transistor is connected to the first compensation control line, a first electrode of the third transistor is connected to the first compensation signal line, and a second electrode of the third transistor is connected to the reset power source line;

a gate of the fourth transistor is connected to the second compensation control line, a first electrode of the fourth transistor is connected to the second compensation signal line, and a second electrode of the fourth transistor is connected to the reset power source line; and the voltage-dividing resistor is connected between the second compensation signal line and the first electrode of the fourth transistor.

8. The pixel circuit according to claim 1, wherein each transistor in the pixel circuit comprises: an active layer, a gate metal layer and a source-drain metal layer which are successively stacked, wherein the active layer of the transistor in the compensation circuit extends along a first direction; the compensation control line and the compensation signal line which are connected to the compensation circuit both extend along a second direction, and the compensation control line and the gate metal layer are disposed in the same layer; the compensation signal line and the source-drain metal layer are disposed in the same layer; and the second direction intersects with the first direction.

9. A driving method for a pixel circuit, applicable to the pixel circuit according to claim 1, the method comprising:

in each of refresh periods and each of waiting periods, controlling, by a compensation circuit, a reset power source line to provide the same reset power source signal based on a compensation signal provided by a compensation signal line under control of a compensation control signal provided by a compensation control line, wherein the refresh periods are executed sequentially, and the waiting periods are between every two adjacent refresh periods; and in each of the refresh period, controlling, by a driving circuit, a connection between the reset power source line and a driving node connected to a light-emitting component to be firstly switched on and then switched off under control of a reset control signal provided by a reset control line, and after controlling the connection between the reset power source line and the driving node to be switched off, transmitting, by the driving circuit, a light emission driving signal to the driving node based on a driving control signal provided by a driving control line so as to drive the light-emitting component to emit light.

10. The method according to claim 9, wherein the compensation control line comprises a first compensation control line and a second compensation control line; a potential of the compensation signal is determined based on a potential of the driving node when the light-emitting component emits light at a target greyscale; and said controlling, by the compensation circuit, the reset power source line to provide the same reset power source signal based on the compensation signal provided by the compensation signal line under control of the compensation control signal provided by the compensation control line comprises:

in each of the refresh periods, controlling, by the compensation circuit, both a connection between the compensation signal line and an equivalent node of the driving node and a connection between the reset power source line and the equivalent node to be switched off under control of a first compensation control signal provided by the first compensation control line and a second compensation control signal provided by the second compensation control line; and in each of the waiting periods, controlling, by the compensation circuit, the connection between the compensation signal line and the equivalent node and the connection between the reset power source line and the equivalent node to be alternately switched on under control of the first compensation control signal and the second compensation control signal so as to control the reset power source line to provide the same reset power source signal in both the refresh period and the waiting period.

11. The method according to claim 9, wherein the compensation control line comprises: a first compensation control line and a second compensation control line; the compensation signal line comprises: a first compensation signal line and a second compensation signal line, a compensation signal provided by the first compensation signal line is the reset power source signal provided by the reset power source line in the refresh periods, and the reset power source signal provided by the reset power source line is controlled to be the same as the compensation signal provided by the first compensation signal line based on a compensation signal provided by the second compensation signal line; and said controlling, by the compensation circuit, the reset power source line to provide the same reset power source signal based on the compensation signal provided by the compensation signal line under control of the compensation control signal provided by the compensation control line comprises:

in each of the refresh periods, controlling, by the compensation circuit, a connection between the first compensation signal line and the reset power source line to be switched on under control of a first compensation control signal provided by the first compensation control line, and controlling, by the compensation circuit, a connection between the second compensation signal line and the reset power source line to be switched off under control of a second compensation control signal provided by the second compensation control line; and in each of the waiting periods, controlling, by the compensation circuit, the connection between the second compensation signal line and the reset power source line to be switched on under control of the second compensation control signal, and controlling, by the compensation circuit, the connection between the first compensation signal line and the reset power source line to be switched off under control of the first compensation control signal.

12. A display panel, comprising: a substrate and pixels disposed on the substrate, wherein each of the pixels comprises: a light-emitting component and the pixel circuit as defined in claim 1, wherein the pixel circuit is connected to the light-emitting component and is configured to drive the light-emitting component to emit light.

13. The display panel according to claim 12, wherein the substrate comprises a display region and a non-display region which are adjacent; and the driving circuit comprised in the pixel circuit is disposed in the display region, and the compensation circuit comprised in the pixel circuit is disposed in the non-display region.

14. A display device comprising: a power supply assembly and a display panel, wherein the power supply assembly is connected to the display panel and is configured to supply power to the display panel;

the display panel comprises a substrate and pixels disposed on the substrate, wherein each of the pixels comprises: a light-emitting component and a pixel circuit, wherein the pixel circuit is connected to the light-emitting component and is configured to drive the light-emitting component to emit light; and the pixel circuit comprises:

a driving circuit which is respectively connected to a driving control line, a reset control line, a reset power source line and a driving node and is configured to: transmit a light emission driving signal to the driving node based on a driving control signal provided by the driving control line; and control switching on and off of a connection between the reset power source line and the driving node under control of a reset control signal provided by the reset control line, the driving node being configured to be connected to a light-emitting component; and a compensation circuit which is respectively connected to a compensation control line, a compensation signal line and the reset power source line, and is configured to control the reset power source line to provide the same reset power source signal at any period based on a compensation signal provided by the compensation signal line under control of a compensation control signal provided by the compensation control line;

wherein the compensation control line comprises a first compensation control line and a second compensation control line; a potential of the compensation signal provided by the compensation signal line is determined based on a potential of the driving node when the light-emitting component emits light at a target greyscale;

the compensation circuit is further respectively connected to an equivalent node of the driving node and a pull-down power source line connected to the light-emitting component; the compensation circuit is configured to control switching on and off of a connection between the compensation signal line and the equivalent node based on a first compensation control signal provided by the first compensation control line, control switching on and off of a connection between the reset power source line and the equivalent node based on a second compensation control signal provided by the second compensation control line, and regulate a potential of the equivalent node based on a pull-down power source signal provided by the pull-down power source line; and the driving node is configured to be connected to a first electrode of the light-emitting component, and a second electrode of the light-emitting component is connected to the pull-down power source line.

15. The display device according to claim 14, wherein the compensation circuit comprises:

a first switching sub-circuit which is respectively connected to the first compensation control line, the compensation signal line and the equivalent node, and is configured to control the switching on and off of the connection between the compensation signal line and the equivalent node based on the first compensation control signal;

a second switching sub-circuit which is respectively connected to the second compensation control line, the equivalent node and the reset power source line, and is configured to control the switching on and off of the connection between the reset power source line and the equivalent node based on the second compensation control signal; and a potential-regulating sub-circuit which is respectively connected to the equivalent node and the pull-down power source line, and is configured to regulate the potential of the equivalent node based on the pull-down power source signal.

16. The display device according to claim 15, wherein the first switching sub-circuit comprises a first transistor, the second switching sub-circuit comprises a second transistor, and the potential-regulating sub-circuit comprises a capacitor, wherein a gate of the first transistor is connected to the first compensation control line, a first electrode of the first transistor is connected to the compensation signal line, and a second electrode of the first transistor is connected to the equivalent node;

a gate of the second transistor is connected to the second compensation control line, a first electrode of the second transistor is connected to the reset power source line, and a second electrode of the second transistor is connected to the equivalent node; and the capacitor is connected between the equivalent node and the pull-down power source line.

17. The display device according to claim 14, wherein the compensation control line comprises: a first compensation control line and a second compensation control line; the compensation signal line comprises: a first compensation signal line and a second compensation signal line; a compensation signal provided by the first compensation signal line is a reset power source signal provided by the reset power source line in a refresh period, and the reset power source signal provided by the reset power source line is controlled to be the same as the compensation signal provided by the first compensation signal line based on a compensation signal provided by the second compensation signal line; and the compensation circuit is configured to control switching on and off of a connection between the first compensation signal line and the reset power source line based on a first compensation control signal provided by the first compensation control line, and control switching on and off of a connection between the second compensation signal line and the reset power source line based on a second compensation control signal provided by the second compensation control line.

18. The display device according to claim 17, wherein the compensation circuit comprises:

a third switching sub-circuit which is respectively connected to the first compensation control line, the first compensation signal line and the reset power source line, and is configured to control the switching on and off of the connection between the first compensation signal line and the reset power source line based on the first compensation control signal; and a fourth switching sub-circuit which is respectively connected to the second compensation control line, the second compensation signal line and the reset power source line, and is configured to control the switching on and off of the connection between the second compensation signal line and the reset power source line based on the second compensation control signal.

* * * * *